(12) United States Patent
Issing et al.

(10) Patent No.: US 10,399,776 B2
(45) Date of Patent: Sep. 3, 2019

(54) STORAGE AND ORDER-PICKING SYSTEM AND METHOD FOR STORING PIECE GOODS IN AN ORDER-PICKING MACHINE

(71) Applicant: SSI Schäfer Automation GmbH (DE), Giebelstadt (DE)

(72) Inventors: Elmar Issing, Giebelstadt (DE); Christian Herzmaier, Würzburg (DE)

(73) Assignee: SSI Schäfer Automation GmbH (DE), Giebelstadt (DE)

( * ) Notice: Subject to any disclaimer, the term of this patent is extended or adjusted under 35 U.S.C. 154(b) by 0 days.

(21) Appl. No.: 15/955,919

(22) Filed: Apr. 18, 2018

(65) Prior Publication Data

US 2018/0237222 A1    Aug. 23, 2018

Related U.S. Application Data

(63) Continuation of application No. PCT/EP2016/074467, filed on Oct. 12, 2016.

(30) Foreign Application Priority Data

Nov. 3, 2015 (DE) .......................... 10 2015 118 832

(51) Int. Cl.
*B65G 1/137* (2006.01)
*G06Q 10/08* (2012.01)
*G06Q 50/28* (2012.01)

(52) U.S. Cl.
CPC ......... *B65G 1/1371* (2013.01); *B65G 1/1373* (2013.01); *B65G 1/1376* (2013.01);
(Continued)

(58) Field of Classification Search
CPC .... B65G 1/1371; B65G 1/137; B65G 1/1373; B65G 1/04; B65G 1/0492; B65G 65/08;
(Continued)

(56) References Cited

U.S. PATENT DOCUMENTS 4,508,484 A    4/1985 Heiz
4,669,047 A    5/1987 Chucta
(Continued)

FOREIGN PATENT DOCUMENTS

AT    502 982 A1    6/2007
DE    31 00 020 A1    7/1982
(Continued)

OTHER PUBLICATIONS

International Search Report for corresponding Patent Application No. PCT/EP2016/074467 dated Jan. 25, 2017.

*Primary Examiner* — James R Bidwell
(74) *Attorney, Agent, or Firm* — Renner, Otto, Boisselle & Sklar, LLP

(57) ABSTRACT

A storage and order-picking system including at least one order-picking machine configured to store, collect, buffer, and deliver piece-goods in an automated manner, each machine including storage locations having an individualizing storage-location label; a receiving station configured to capture at least one labeling attribute of a goods-receipt piece-good, a transport system including transport carriers, each having deposition locations where the captured goods-receipt piece-good can be placed for loading the carrier, and a deposition-location label is assigned; and a DPS configured, to manage and update a reference table; wherein the transport system connects the receiving station and the machine for transporting one of the transport carriers therebetween, wherein the DPS is further configured to update the reference table for the goods-receipt piece-good by assignment based on the captured attribute, based on a deposition-location label of a selected deposition location, and based on a storage-location label of a selected storage location.

16 Claims, 7 Drawing Sheets

(52) U.S. Cl.
CPC ........... *G06Q 10/08* (2013.01); *G06Q 10/087* (2013.01); *G06Q 50/28* (2013.01)

(58) Field of Classification Search
CPC ...... G06Q 10/087; G06Q 10/08; G06Q 50/28; B66F 9/063
USPC ........................ 198/347.1, 348, 358; 414/273
See application file for complete search history.

(56) References Cited

U.S. PATENT DOCUMENTS

| | | | | |
|---|---|---|---|---|
| 5,953,234 A | * | 9/1999 | Singer | B65G 1/0485 |
| | | | | 414/789.6 |
| 9,725,241 B2 | | 8/2017 | Swinkels et al. | |
| 10,065,799 B2 | * | 9/2018 | Einav | B65D 21/0235 |
| 2005/0060164 A1 | * | 3/2005 | Eli Berl Illion | G06Q 10/08 |
| | | | | 705/28 |
| 2015/0291356 A1 | * | 10/2015 | Oki | B65G 1/0407 |
| | | | | 414/273 |
| 2016/0101940 A1 | * | 4/2016 | Grinnell | G05D 1/0297 |
| | | | | 700/216 |
| 2016/0107838 A1 | * | 4/2016 | Swinkels | B66F 9/063 |
| | | | | 414/273 |

FOREIGN PATENT DOCUMENTS

| | | |
|---|---|---|
| DE | 92 03 273 U1 | 9/1992 |
| DE | 10 2005 042 643 A1 | 4/2007 |
| DE | 10 2008 039 764 A1 | 5/2010 |
| DE | 10 2006 057 758 B4 | 9/2010 |
| DE | 10 2013 103 869 A1 | 10/2014 |
| DE | 10 2013 106 640 A1 | 1/2015 |
| EP | 2 065 317 A1 | 6/2009 |
| WO | 2005/113389 A1 | 12/2005 |
| WO | 2006/051329 A2 | 5/2006 |
| WO | 2007/048155 A1 | 5/2007 |
| WO | 2007/068406 A1 | 6/2007 |
| WO | 2008/068264 A1 | 6/2008 |
| WO | 2010/017873 A1 | 2/2010 |
| WO | 2014/170433 A1 | 10/2014 |
| WO | 2015/039818 A1 | 3/2015 |

* cited by examiner

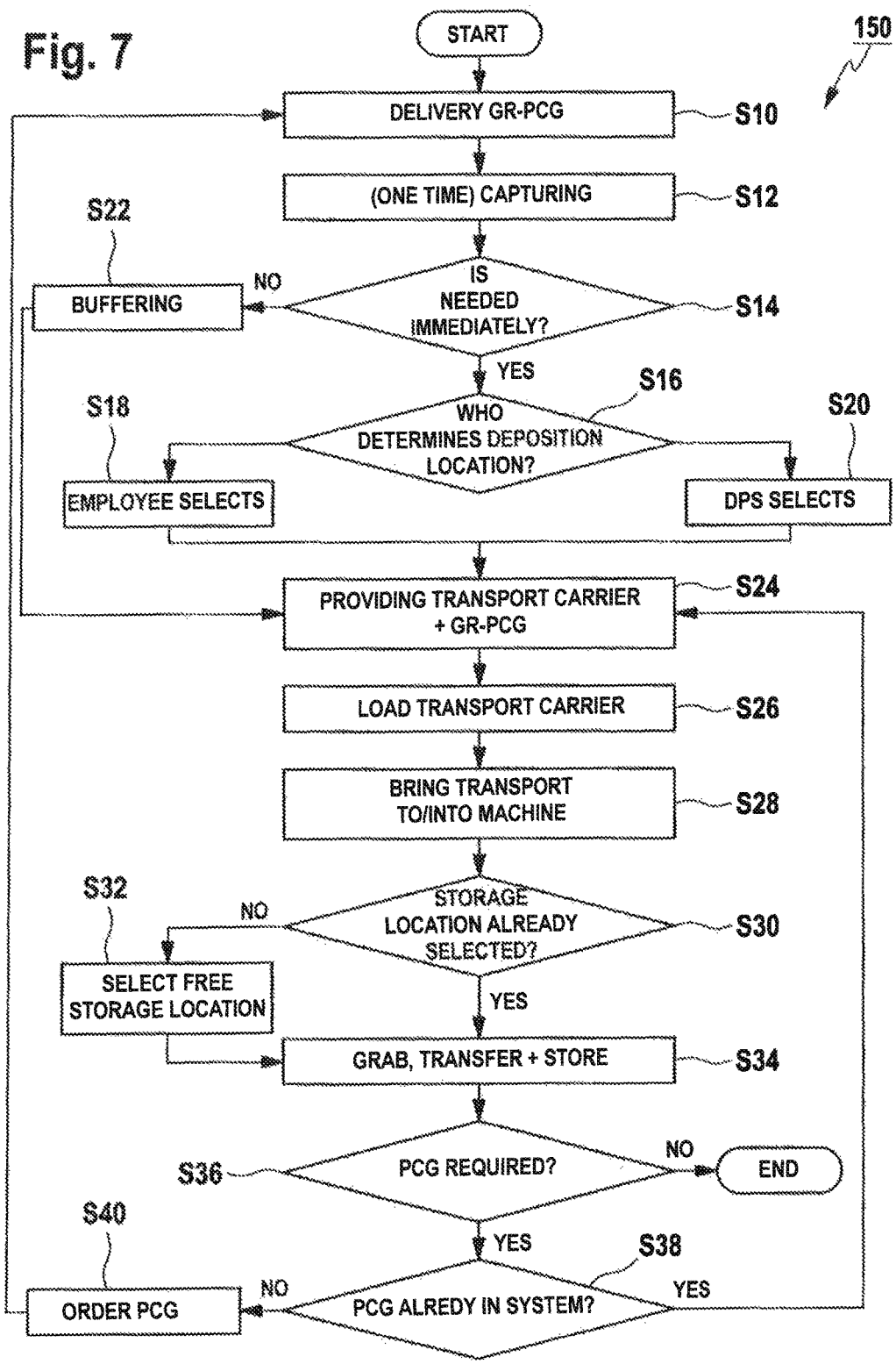

STORAGE AND ORDER-PICKING SYSTEM AND METHOD FOR STORING PIECE GOODS IN AN ORDER-PICKING MACHINE

RELATED APPLICATION

This is a continuation application of the co-pending international patent application PCT/EP2016/074467 (WO 2017/076595 A1) filed on Oct. 12, 2016, which claims priority of the German patent application DE 10 2015 118 832.5 filed on Nov. 3, 2015, both of which are fully integrated herein by reference.

BACKGROUND OF THE INVENTION

The present invention relates to a storage and order-picking system for picking piece goods by means of an order-picking machine being configured to store, pick, and deliver the piece goods in a fully automated manner. The invention further relates to a method for filling an order-picking machine with piece goods. The invention is particularly used in the trade of pharmaceuticals, and particularly relates to piece-picking applications.

RELATED PRIOR ART

Computer-controlled order-picking warehouses are known for a long time. For example, the document DE 31 00 020 A1 discloses a computer-controlled order-picking warehouse having several areas in which piece goods, or articles, are stored corresponding to an access, or removal, frequency (e.g., ABC distribution) thereof. Manual, semi-automated, and fully-automated picking areas exist all being connected to each other via one (single) conveyer (steady conveyer) for transporting collecting means (such as order containers, cartons, tubs, trays, or the like) between the areas. Each of the areas substantially stores articles of one of the removal, or access, frequency categories.

In general, articles having a high access frequency (articles of type A) are often picked in an area (or zone) of the overall system where order-picking machines (so-called full automatons) are used for reconciling (i.e. removing and collecting) and delivering the articles in a fully automated manner.

The document DE 92 03 273 U1 discloses a corresponding zone having corresponding full automatons which are designated as "A-frames". These full automatons comprises an A-shaped base frame, wherein the articles (preferably articles of type A) are stored along the substantially vertically orientated legs of the base frame in shafts for being dispensed at the foot of the shafts, by means of dispensers, onto a central belt extending through the legs for passing each of the shafts of the full automaton. The filling of the article-storage shafts happens manually out of storage racks arranged in the vicinity of the full automatons.

A further full automaton (pharmacy automaton) is disclosed in WO 2006/051329 A2.

The document WO 2010/017873 A1 discloses a semi automaton formed by a rack arrangement including flow-channel racks for providing storage containers. The storage containers are fed from the rear in a fully automated manner by means of one-plane storage and retrieval devices (shuttles) into the flow channels of the flow-channel racks. The picking happens manually from the front by removing articles manually from the storage containers which are located in the front of the respective flow channel. The removed articles are delivered manually to order containers which are led beyond the rack by means of a conveying system. Storage containers containing the piece goods which are no longer required can also be transported via this conveying system.

Since the above-mentioned "A-frames" are used only, as a rule, for piece goods having a high access-frequency category and since the piece goods need to be "automaton-suitable" (i.e., preferably have shape of a parallelepiped) a combination with full automatons for piece goods of an average, and/or low, access-frequency category (articles of type B and/or articles of type C) have already been conceived. The document WO 2015/039818 A1 discloses a full automaton for articles of type B and/or articles of type C. These full automatons are arranged in common with full automatons for articles of type A along a central belt (discharging conveyer system) one behind the other. The full automaton for the articles of type B and/or articles of type C is realized in terms of a rack block which is closed in it. The rack block is arranged laterally adjacent to the central belt. The rack block comprises two (stationary) racks having a plurality of storage locations. The racks define a rack aisle therebetween. In the rack aisle at least one rail-bound storage and retrieval device moves, which comprises a horizontally moveable carriage including a vertically orientated mast, wherein a load-handling device (e.g., gripper) moves vertically along the mast for storing and retrieving articles transversally relative to the rack aisle into and from the storage locations (rack compartments). The load-handling device comprises a prong-shaped gripper for grabbing the articles laterally. The gripper can be moved in and out of the storage locations in the transversal direction. Both the storage and retrieval of the articles is conducted fully automated by means of the storage and retrieval device. For the purpose of picking, retrieved articles are delivered by the storage and retrieval devices to rack-integrated buffer trays. The buffer trays are arranged and formed such that buffered articles can be delivered at any desired time to the central belt guided externally along the rack block. The storing of the articles into the rack block is conducted via a buffering belt being arranged externally to the rack block and adjacent to the rack block. Articles which are to be stored are detected, in the area of the buffering belt, by means of a scanner for determining an identity thereof. The identified articles which are to be stored are then delivered to a rack-integrated transfer location which substitutes a conventional storage location. The storage and retrieval devices retrieve the article, which is to be stored, from the rack-integrated transfer location, and store the article, which is to be stored, into a free (i.e. unoccupied) storage location subsequently. The storing process typically happens during times when the storage and retrieval devices are not dealing with picking tasks (collecting and delivering).

WO 2005/113389 A1 discloses the same method as the above-mentioned WO 2015/039818 A1, wherein the rack blocks and buffer trays are operated manually instead of being operated in an automated manner.

In WO 2015/039818 A1 the articles are identified temporally briefly before they are actually stored (again) into the rack block, because the articles which are to be stored are delivered to the respective rack block in rack-block specific transport containers in a mixed manner. The transport containers regularly contain different article types so that it is mandatory for a storage-location management to uniquely identify the article which is just to be stored. But even in the case when the transport container merely contains articles of one single type, it is necessary to identify the respective article securely, because the articles which are to be stored can belong, for example, to different batches, and therefore can include, for example, different dates of minimum durability. In particular, this is relevant in the field of trading pharmaceuticals and in food retail, in order to name some examples only. So-called replenishment filling is thus associated with efforts, and requires a reliable identification of the articles briefly before actually being stored into the respective rack block. Thus, the articles are "touched" many times before actually being stored. In case that the system comprises several ones of these rack blocks the replenishment-transport containers need to be pre-configured in a rack-specific manner. This configuration is typically conducted in a goods-receipt area of the system, or already in a system-external manner at the supplier of the replenishment articles. These configuration processes are to be simplified.

Moreover, an initial filling of these rack blocks is time-intensive because each of the articles, which are to be stored, needs to be identified and can get into the rack blocks only via the rack-integrated transfer location.

This is also true for the rack-block type described in WO 2015/039818 A1 which does not comprise a buffering belt feeding from the outside. Rack blocks of different manufacturers exist which do not comprise a rack-integrated replenishment station being operated manually. With such manual replenishment stations the to-be-stored articles are typically put one-by-one in an opening, which can be closed from the outside, within the rack block. At this place the put-in article is identified and subsequently retrieved by the storage and retrieval device for the purpose of storing. This takes long.

With both the automated buffering-belt solution and the manual replenishment station space is further lost for the overall system because space is required in the immediate vicinity of the rack blocks for feeding the articles, which are to be stored, to the respective rack block. Thus, storage density (number of stored articles per unit of volume) decreases.

Further, DE 10 2006 057 758 B4 discloses a method and apparatus for picking goods as well as a warehouse-management system. DE 10 2005 042 643 A1 discloses an order-picking method. AT 502 982 31 discloses a method and system for picking articles.

SUMMARY OF THE INVENTION

Therefore, it is an object of the present invention to provide a system and method enabling an enhanced fully-automated picking including a fully-automated storage.

According to one aspect of the invention there is provided a storage and order-picking system for picking piece goods in accordance with picking orders, wherein the piece goods belong to different access-frequency categories, and wherein the system comprises: at least one order-picking machine, in particular a full automaton, for piece goods substantially belonging to a, preferably average or low, access-frequency category, wherein each of the machines is configured to store, collect, buffer, and deliver the piece goods in a fully automated manner, wherein each of the machines comprises a plurality of storage locations, in particular rack-storage locations, and wherein each of the storage locations comprises an individualizing storage-location label. The system further comprises one, preferably single, receiving station being configured to capture, or detect, at least one labelling attribute such as a barcode, date of minimum durability, batch number, article-identifying number, article name, or the like of a goods-receipt piece good. For the capturing a capturing device is used such as a scanner, keyboard, imaging system including image-recognition software, or the like. The system further comprises a transport system having a plurality of transport carriers. The transport carriers can be implemented, in particular, as trays which preferably are formed rimless, or frameless. The transport carriers can be anti-slip coated. The transport carriers can comprise visually recognizable markers such as lines for the definition of deposition locations, or for the visualization of the deposition locations. Each of the transport carriers comprises a plurality of deposition locations. Each of the deposition locations is, in particular, distinguishable, uniquely determined, in advance geometrically defined in a fixed manner, and does not overlap with any other deposition location. The deposition location represents a location where the captured goods-receipt piece good can be placed for the purpose of loading the transport carrier, wherein an individualizing deposition-location label is assigned to each of the deposition locations. The system further comprises a data-processing system (DPS) such as a host computer, a central computer, a warehouse-management computer, and/or a material-flow computer. The data-processing system is configured to manage and update a reference table, wherein the table is configured to assign the attribute, one of the deposition locations, and one of the storage locations, to the goods-receipt piece good, in particular fixedly and permanently. The transport system connects, in terms of material flow, the receiving station and the at least one machine to each other for transporting one of the transport carriers, which is loaded in the receiving station with the captured goods-receipt piece good by placing the captured goods-receipt piece good onto a selected deposition location, from the receiving station to the at least one machine, in particular into the at least one machine, and for transporting back, preferably at least partially, emptied transport carriers to the receiving station for the purpose of loading. Further, the data-processing system is configured to update the reference table, which in particular corresponds to a storage location/site-referencing table, for the goods-receipt piece goods by assignment based on the detected attribute, based on a deposition-location label of a selected deposition location, and based on a storage-location label of a selected storage location.

According to another aspect of the invention there is provided a storage and order-picking system for picking piece goods in accordance with picking orders, wherein the piece goods belong to different access-frequency categories, comprising: at least one order-picking machine dedicated to piece goods substantially belonging to one of the access-frequency categories, wherein each of the order-picking machines is configured to store, collect, buffer, and deliver the piece goods in a fully-automated manner, wherein each of the order-picking machines comprises a plurality of storage locations, wherein each of the storage locations comprises an individualizing storage-location label; a receiving station being configured to capture a labeling attribute of one of the goods-receipt piece goods; a transport system comprising a plurality of transport carriers, wherein each of the transport carriers comprises a plurality of deposition locations where the one of the goods-receipt piece goods is placable for the purpose of loading the transport carrier, and wherein an individualizing deposition-location label is assigned to each of the deposition locations; and a data-processing system (DPS) being configured to manage and update a reference table, wherein the reference table is configured to assign the labeling attribute, one of the deposition locations, and one of the storage locations to the one of the goods-receipt piece goods; wherein the transport system connects, in terms of material flow, the receiving station and the at least one order-picking machine for transporting one of the transport carriers, which is loaded in the receiving station with the one of the goods-receipt piece goods by placing the one of the goods-receipt piece goods onto a selected one of the deposition locations, from the receiving station to the at least one order-picking machine, and for transporting emptied ones of the transport carriers back to the receiving station for the purpose of loading; and wherein the DPS is further configured to update the reference table for the one of the goods-receipt piece goods by assignment based on the captured labeling attribute, based on a deposition-location label of a selected one of the deposition location, and based on a storage-location label of a selected one of the storage locations.

The invention further distinguishes in that the to-be-stored piece goods need to be captured only once for (uniquely) being identified for storage into the order-picking machine. This identification can happen manually, semi-automated or fully-automated (e.g., by means of the applicant's "order verifier" being disclosed in DE 10 2010 033 697 A1). This identification occurs in the receiving station, which is arranged in particular in the goods-receipt area of the system. This means that the (goods-receipt) piece goods need to be captured, or identified, only one single time, namely in particular at the time when the piece goods are fed into the system. Typically, the piece goods enter the system via the goods-receipt area. The piece goods which are stored into the machine then are not identified once again at the machines. The identification occurs simultaneously with a receiving check of the piece goods in the goods receipt. During this check it is ensured that the new delivered piece goods, which are sent to the system by suppliers, correspond to the ordered (replenishment) piece goods.

The newly delivered piece goods, i.e. the goods-receipt piece goods, do not need to be configured by the suppliers in a machine-specific manner, i.e. do not need to be composed in advance. Goods-receipt piece goods can be delivered type-pure by the suppliers, e.g., on pallets. Separation of such type-pure goods-receipt piece goods occurs in the receiving station, preferably in a machine-specific manner onto the transport carriers. A storage-location management (controlling software) can determine, in particular in advance, a machine-specific (i.e. particularly in a demand-based manner) loading of transport carriers with piece goods for the respective replenishment. The loaded transport carriers can then be moved to the machines in an automated manner. Thus, the storage of the piece goods into the machines and the (machine-specific and demand-based) loading of the transport carriers can be decoupled temporally.

As soon as a goods-receipt piece good is placed on a deposition location of one of the transport carriers, this piece good can be tracked unambiguously in terms of data. This means that due to the placing of the piece good on the transport carrier even a later storage location within the machine is trackable. The to-be-stored piece goods are no longer mixed after the initial goods-receipt inspection and loading. A repeated identification in the immediate area of the machine for ensuring that the right piece good is placed on the correct storage location is superfluous.

Apart from the temporal decoupling and the saving of the additional detection/identification step the utilization of the transport carrier has the advantage that a large number of to-be-stored piece goods (goods-receipt piece goods) can be stored into the respective machine simultaneously. The transport carriers can receive a large number of to-be-stored piece goods each of which is transferred simultaneously into the respective machine. Several transport carriers can be fed into the respective machine within short time so that, in particular, an initial filling of the respective machine occurs fast.

The utilization of the transport carrier further allows a so-called "cross docketing" operation of the machine. This means that goods-receipt piece goods, which have just been supplied to the respective machine on transport carriers, can be picked directly from these transport carriers without being stored in one of the storage locations in advance. Thus, the transport carriers are used temporarily like conventional storage locations for the purpose of picking. This "cross docketing" operation is of particular advantage at times of a peak load (such as during a phase of special offer or during Christmas business) because the picking performance (picks per hour) can be kept high since favorited piece goods are always available for picking and do not run out.

Further, it is preferred to configure the receiving station such that the deposition-location label of the selected deposition location can be captured there.

This is particularly advantageous in case where an employee selects the actual deposition location. This means that the data-processing system does not preset the free deposition location in a fixed manner, but the free deposition location is selected by the employee depending on the situation, which employee has the corresponding transport carrier standing in front of him/her. For this purpose the employee can use a commercial capturing device such as a scanner, a keyboard for inputting a corresponding code in terms of alphanumeric signs, a headset for the input of data by means of voice, or a camera system having an integrated image recognition which is arranged above the transport carrier and monitors the loading process.

Further, it is preferred that the at least one machine comprises: a rack, or a rack arrangement, which is formed preferably of several racks having a rack aisle therebetween and which comprises a plurality of rack shelves being arranged on top of each other and/or next to each other, in which the piece goods storable, preferably without load carriers, single-deep or multiple-deep, preferably next to each other. The at least one machine further comprises at least one, preferably rack-integrated stationary, collecting device which can be realized, e.g., as a funnel, chute, channel, conveying system, or the like. The collecting device is configured for temporarily collecting several piece goods, and comprises a receiving opening as well as a dispensing device. The at least one machine further comprises a storage and retrieval device such as a conventional storage and retrieval device having a mast, or a one-plane storage and retrieval device such as a shuttle moveable in a longitudinal direction along the rack and being configured to store and retrieve the piece goods along a transversal direction, preferably perpendicular to the longitudinal direction and in particular individually in and from each of the storage locations, and deliver the same to the receiving openings of the collecting devices.

Such a machine is operated in a fully-automated manner. Both the storage and retrieval of the piece goods is performed fully automated. The collecting devices allow a temporal decoupling of the picking process and the transporting away of a completely picked order. Such a machine is particularly used in the field of pharmaceuticals, and there designated as "pharmacy machine".

Further, it is preferred that the transport system comprises a plurality of driverless transport vehicles (DTV), wherein the DTV are configured to transport the transport carriers through the system.

A driverless transport system (DTS) having a plurality of DTV has the advantage that transport paths can be defined arbitrarily and are changeable. One is not bound to the static course of tracks of a steady conveyer (e.g. roller conveyer). Depending on demand more or less DTV can be used in the system (scalability). The DTV can also be used for picking, or retrieving completely picked piece goods. If no conventional conveying system (steady conveyer) is used, the DTV have sufficient space for arbitrarily defining and moving along traveling paths.

Further, it is advantageous to configure the at least one machine such that the DTV can travel through the at least one machine for unloading the transport carrier within the at least one machine, and in particular to deliver and receive the transport carriers there.

By shifting the "goods receipt" of the machine into machine space can be gained. The machines can be arranged more densely to each other. The storage density increases. The traffic of the DTV outside of the machine can flow freely, because the DTV are not required to stop outside of the machine for delivering the piece goods which are to be stored.

Preferably, the DTV are guided past the at least one machine, and/or through the at least one machine so that picked piece goods can be delivered in an automated manner to the DTV.

In this case the unitary transport concept is expressed. The DTV are used for both the storage and retrieval of the piece goods. With the retrieval, or the transporting away, of completely picked orders it is possible to conduct a flowing (continuous) hand-over of piece goods by not stopping the DTV during handing over the collected piece goods, but the DTV travel further. In this case it is remains unconsidered whether the retrieval DTV travel past the machine, or travel through the machine.

With another preferred embodiment each of the machines is arranged within a picking area of the system, wherein the receiving station is arranged in a goods-receipt area of the system, and wherein the areas of the system are arranged remote to each other.

The storing process and the receiving process, including the capturing of the goods-receipt piece goods, are shifted, in comparison to the prior art, from the machine towards one, preferably single, central location. Even this measure allows an increase of the storage density and the "one-touch" concept.

In particular, the goods-receipt piece good can be stored via the transport carriers into the at least one machine only.

Even in this case a unitary transport concept is expressed. As soon as the goods-receipt piece goods are placed on the transport carriers a location thereof is unambiguously defined and trackable. Already captured goods-receipt piece goods are no longer mixed, like it was the case, for example, with the conventional transport containers which have been transported towards the machine-integrated receiving stations of the conventional machines.

In addition, it is advantageous if the system further comprises at least one transport-carrier buffering station arranged within the at least one machine, wherein a storage and retrieval device of the at least one machine is moveable along the buffering station for grabbing to-be-stored goods-receipt piece goods from the transport carriers and delivering the same to free storage locations, preferably chaotically, wherein the storage locations, to which the to-be-stored goods-receipt piece goods have already been delivered, are identified as occupied storage locations, and a corresponding information such as an article ID, rack compartment ID, number of pieces, storage location ID, or the like is communicated to the reference table for the purpose of a corresponding update (and acknowledgement), if necessary.

Thus, the reference table can always indicate the current whereabouts of a piece good in an unambiguous manner, even in case when the final storage location has not been determined yet in detail.

Preferably, the receiving station comprises a further transport-carrier buffering station.

This measure allows temporal decoupling of the loading of the transport carriers and transport of the transport carriers to the corresponding machines. The transport carriers can be loaded with piece goods on demand in a machine-specific manner. The transport carriers are preferably transported to their associated machine only in case when they are completely filled with goods-receipt piece goods which are to be stored.

With another preferred embodiment each of the transport-carrier buffering stations is configured to receive and buffer the transport carriers in an isolated manner, i.e. independent, from the transport system, preferably in a rack-like frame having at least one plane, and deliver the same later to the transport system again.

Thus, the transport system does not need to be stopped for storing the goods-receipt piece goods into the storage locations. The transport system, in particular the DTV, can thus be operated further continuously, resulting in an increased performance. This is of particular advantage if several machines need to be filled in parallel. In this case the transport system is nevertheless capable of bringing a sufficient number of loaded transport carriers to the corresponding machines, in particular if loading thereof has already been completed.

Further, it is advantageous to further configure the data-processing system such that, based on piece-good demand notifications generated (in a machine-specific manner) by the warehouse management for filling the machines initially and/or again with piece goods, goods-receipt piece goods are assigned to free, i.e. unoccupied, deposition locations, and the deposition locations are displayed in the receiving station, preferably by a monitor or beamer, as soon as a corresponding goods-receipt piece good and the corresponding transport carrier are available for the loading at the receiving station.

In this case the system directs the employee during the loading of the transport carrier. In this case the system has determined in advance where the goods-receipt piece goods are to be placed, or on which of the transport carriers the goods-receipt piece goods are to be placed. Even the destination address of the corresponding transport carrier is determined in advance. This procedure has a particular advantage if several different goods-receipt piece goods have been delivered to the goods receipt, and the order of processing of the delivered goods-receipt piece goods is unknown. In this case it is irrelevant at which time one of the goods-receipt piece goods is to be processed.

In addition, it has an advantage if the at least one machine comprises exchangeable rack shelves, and if the transport carriers are further formed such that the transport carriers can be exchanged against the rack shelves.

In this case it is not necessary that the to-be-stored goods-receipt piece goods are taken individually and transferred and stored within the machine. Within the machine each of the transport carriers can be transferred so that the storing performance is increased significantly because many goods-receipt piece goods, which are to be stored, are stored simultaneously.

In this case there is an advantage if within the machine an automated compaction occurs so that empty as well as full rack shelves, or transport carriers, can be generated by transferring the stored piece goods within the machine. This has the advantage that, if possible, partially filled transport carriers are not transported back to the goods receipt.

According to still another aspect of the invention there is provided a method for filling an order-picking machine with piece goods in a storage and order-picking system, which preferably is formed in accordance with the above-described type, wherein each of the piece goods comprises at least one labelling attribute, wherein the machine is configured to store, collect, and deliver the piece goods in a fully automated manner, wherein the machine comprises a plurality of storage locations, preferably rack-storage locations, wherein each of the storage locations comprises an individualizing storage-location label such as an ID, address, code, or the like, and wherein the method comprises the steps of: providing a goods-receipt piece good and a transport carrier in a receiving station, wherein the transport carrier comprises a plurality of (preferably distinguishable, unambiguously determined, or in advance fixedly defined) deposition locations, wherein each of the deposition locations comprises an individualizing deposition-location label; capturing the attribute of the goods-receipt piece good, preferably in the receiving station; selecting a deposition location on the transport carrier for the goods-receipt piece good, in particular by the employee or the data-processing system; placing the goods-receipt piece good onto the selected deposition location of the provided transport carrier; selecting a free storage location for the goods-receipt piece good, in particular in advance or by a storage and retrieval device depending on the situation; providing a reference table being configured to assign each of the goods-receipt piece goods to its attribute, one of the deposition locations, and one of the storage location; updating the reference table for the goods-receipt piece good by assigning based on the captured attribute of the goods-receipt piece good, based on the deposition-location label of the selected deposition location, and based on the storage-location label of the selected storage location; and transporting the transport carrier, preferably in an automated manner, on which the goods-receipt piece good is placed from the receiving station to the, in particularly into the, machine based on the storage-location label of the goods-receipt piece good.

With a further aspect of the invention it is provided a method for filling an order-picking machine with piece goods in a storage and order-picking system, which system comprises: at least one order-picking machine dedicated to piece goods substantially belonging to one of the access-frequency categories, wherein each of the order-picking machines is configured to store, collect, buffer, and deliver the piece goods in a fully-automated manner, wherein each of the order-picking machines comprises a plurality of storage locations, wherein each of the storage locations comprises an individualizing storage-location label; a receiving station being configured to capture a labeling attribute of one of the goods-receipt piece goods; a transport system comprising a plurality of transport carriers, wherein each of the transport carriers comprises a plurality of deposition locations where the one of the goods-receipt piece goods is placable for the purpose of loading the transport carrier, and wherein an individualizing deposition—location label is assigned to each of the deposition locations; and a data-processing system (DPS) being configured to manage and update a reference table, wherein the reference table is configured to assign the labeling attribute, one of the deposition locations, and one of the storage locations to the one of the goods-receipt piece goods; wherein the transport system connects, in terms of material flow, the receiving station and the at least one order-picking machine for transporting one of the transport carriers, which is loaded in the receiving station (60) with the one of the goods-receipt piece goods by placing the one of the goods-receipt piece goods onto a selected one of the deposition locations, from the receiving station to the at least one order-picking machine, and for transporting emptied ones of the transport carriers back to the receiving station for the purpose of loading; and wherein the DPS is further configured to update the reference table for the one of the goods-receipt piece goods by assignment based on the captured labeling attribute, based on a deposition-location label of a selected one of the deposition location, and based on a storage-location label of a selected one of the storage locations; and wherein the method comprises the steps of: providing the one of the goods-receipt piece goods and one of the transport carriers in the receiving station; capturing the labeling attribute of the one of the goods-receipt piece goods; selecting one of the deposition locations on the one of the transport carriers, which is free, for the one of the goods-receipt piece goods; placing the one of the goods-receipt piece goods on the selected deposition location of the provided transport carrier; selecting a free one of the storage locations for the one of the goods-receipt piece goods; updating the reference table for the one of the goods-receipt piece goods by assignment based on the captured labeling attribute of the one of the goods-receipt piece goods, based on the deposition-location label of the selected deposition location, and based on the storage-location label of the selected storage location; and transporting the one of the transport carriers, on which the one of the goods-receipt piece goods is placed, from the receiving station to the at least one order-picking machine based on the storage-location label of the one of the goods-receipt piece goods.

Preferably, the method further comprises transferring the goods-receipt piece good from the transport carrier in the machine to the selected storage location based on the corresponding storage-location label by means of the storage and retrieval device.

In accordance with another aspect of the present invention a storage and order-picking system for picking piece goods in a fully automated manner is proposed, which system comprises: a goods-receipt area, preferably including a receiving station; several picking areas, wherein each of the picking areas is configured for picking piece goods of a different category, and wherein in each of the picking areas substantially piece goods of one single one of the categories are stored and picked; a goods-issue area, preferably including consolidation, packing, shipping, and the like; a transport system which connects, in terms of material flow, the areas to each other and which represents, preferably exclusively, a driverless transport system (DTS) including a plurality of, preferably autonomously moveable, driverless transport vehicles (DTV), wherein the DTV are configured to carry the destination-load carriers, such as order containers, as well as transport the same between the areas and in particular within the areas; and a controlling device which can be formed centrally, or in a de-centralized manner, and which is configured to assign to each of the picking orders comprising piece goods which are stored in different picking areas and which are to be picked there, one single one of the destination-load carriers, which is then assigned by the controlling device to one of the DTV for which a corresponding transport order is generated such that the assigned DTV retrieves each of the piece goods of the corresponding picking order, which are picked in the corresponding picking areas, by means of the one single destination-load carrier in or at the corresponding picking areas, and then transports the same into the goods-issue area. Preferably, replenishment piece goods, which are required for initial or repeated filling of one of the picking areas and which have already been received in the goods-receipt-area, are transported by the DTV into the corresponding picking area and stored automatically there.

In particular, the replenishment piece goods are captured in the goods-receipt area, and transferred, preferably individually, onto the transport carriers which are transported by the DTV into the corresponding picking areas, wherein the deposition locations of the replenishment piece goods on the transport carriers are tracked by the controlling device.

Also, it has an advantage if one of the picking areas comprises at least one, preferably fully automated, order-picking machine which in turn comprises: a rack having a plurality of rack compartments which are arranged on top of each other and/or next to each other, wherein each of the rack compartments comprises one rack shelf on which the articles, preferably without load carriers, can be stored single-deep or multiple-deep next to each other; at least one buffering device, which comprises a collecting device having a receiving opening and an automated delivering device, wherein the delivering device is configured to deliver collected piece goods; and a storage and retrieval device which is moveable in a longitudinal direction of the rack and which is configured to store and retrieve the piece goods in a transversal direction individually in and from the respective rack compartment, and deliver the same to the receiving openings.

BRIEF DESCRIPTION OF THE DRAWINGS

It is clear that the above-mentioned and hereinafter still to be explained features are not only usable in the respectively given combination but also in different combinations, or alone, without departing from the scope of the present invention.

Embodiments of the invention are depicted in the drawings and will be explained in more detail in the following description, wherein:

FIG. 7 shows a flowchart f a method for filling an order-picking machine.

PREFERRED EMBODIMENTS OF THE INVENTION

Figure 1:
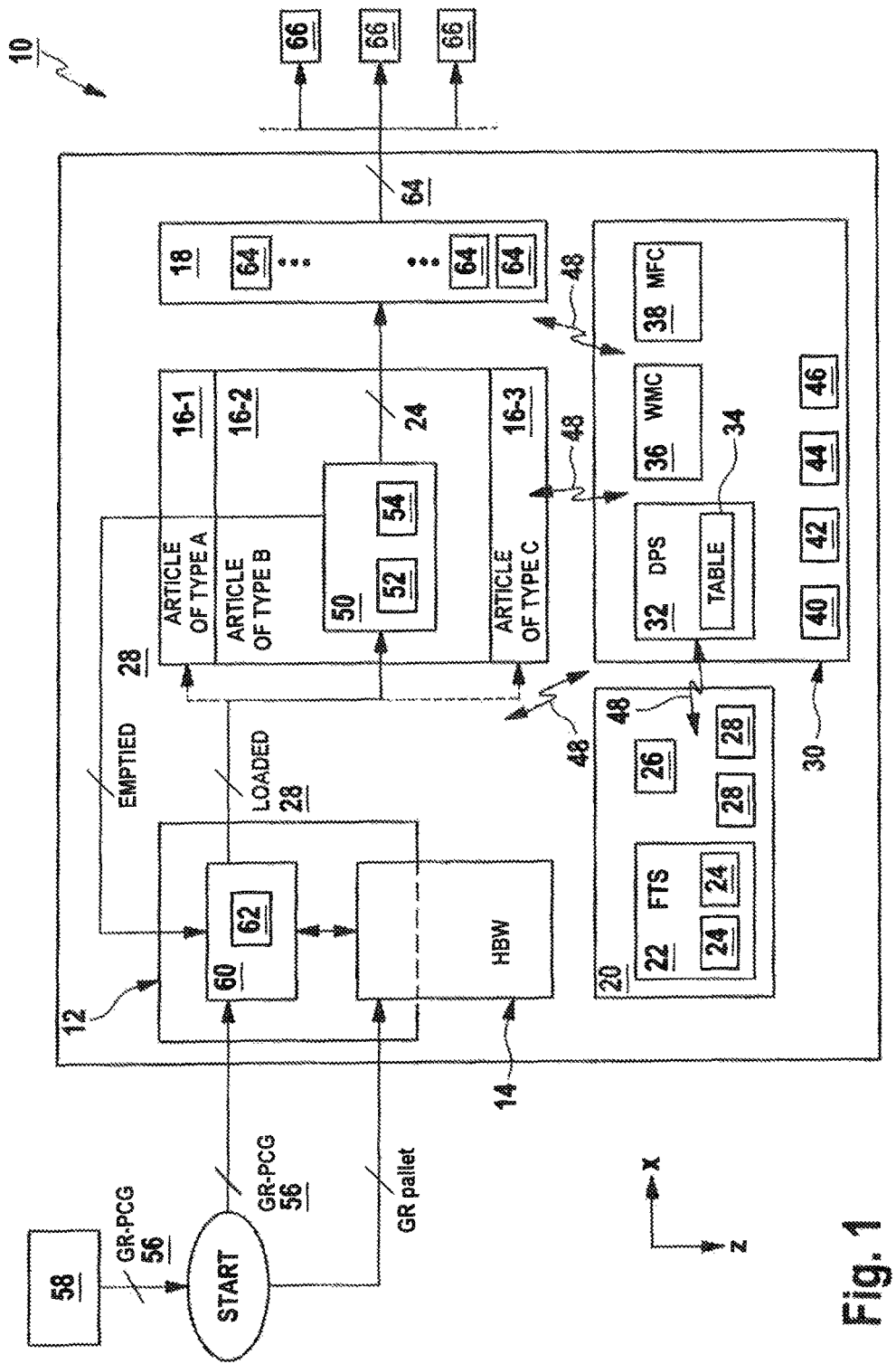
FIG. 1 shows a block diagram of a system of the invention.

FIG. 1 shows a block diagram of a storage and order-picking system 10 of the invention which hereinafter is also briefly designated as the system 10 only. It is clear that the components of the system 10 described in the following can be implemented in terms of hardware, software, or a combination of hardware and software.

The system 10 comprises a goods-receipt area (GR area) 12, an optional long-term warehouse 14 including, for example, a high-bay warehouse (HBW), as well as a picking area 16. The picking area 16 can be divided, for example, in according with retrieval frequencies or access frequencies. In FIG. 1 the picking area 16 is divided into three parts. A first picking area 16-1 serves for picking the above-mentioned articles of type A. A second picking area 16-2 serves for picking articles of type B. A third picking area 16-3 serves for picking articles of type C. It is clear that the division of the areas 16-1 to 16-3 according to access frequencies is arbitrary. It is clear that more or less than the shown access-frequency categories A, B, and C can be used. Further, it is clear that the picking areas 16-1 to 16-3 can be dimensioned differently. The picking areas 16-1 to 16-3 can overlap. Each of the picking areas 16-1 to 16-3 serves for picking and storing of piece goods (PCG) of substantially one single access-frequency category. However, it is possible that the picking areas 16-1 to 16-3 contain some few piece goods of a different access-frequency category, since a category-pure storage is not always possible.

Further, the system 10 comprises a goods-issue area (GI area) 18 which often takes over the function even of a shipping area where picked piece goods are packed and finished for shipping.

In addition, the system 10 comprises a transport system 20 by which the piece goods are transported from the goods receipt to the goods issue through the system 10 as will be explained hereinafter in more detail. The transport of the piece goods within the system 10 occurs, preferably only, by the transport system 20. The transport system 20 preferably comprises a driverless transport system (DTS) 22 having driverless transport vehicles (DTV) 24 only, wherein exemplarily two DTV 24 thereof are shown in FIG. 1. It is clear that the DTS 22 typically comprises a large number of DTV 24. Alternatively or additionally, the transport system 20 can optionally comprise a stationary conveying system 26 (e.g., steady conveyers such as roller conveyers, belt conveyers, chain conveyers, over-head conveyers, or the like). In addition, the transport system 20 comprises a plurality of transport carriers 28, wherein in FIG. 1 only two of them are exemplarily illustrated and will be described in more detail hereinafter. In general, material flow within the system 10 can be conducted by the DTV 24 only, the conveying system 26 only, or a hybrid thereof.

The system 10 further comprises a controlling device 30, which can be implemented centrally, or in a de-centralized manner, by, for example, a plurality of computers (not shown) and/or controlling modules. The controlling device 30 is one example of an implementation in terms of a combination of hardware and software. The controlling device 30 comprises at least one data-processing system (DPS) 32 which manages and updates a reference table 34, as will be described in more detail hereinafter. The reference table 34 can be stored in a storage (not depicted) of the DPS 32. The table is used for referencing locations. The controlling device 30 can be the DPS 32 in a system-comprehensive manner, or a component (hardware and/or software) of the machines 50 which are to be described hereinafter.

The controlling device 30 and/or the DPS 32 can further comprise a warehouse-management computer (WMC) 36 which is operated by corresponding warehouse-managing software for tracking, for example, a stock of piece goods within the system 10 in a time-current manner. The controlling device 30 and/or the DPS 32 can further comprise a material-flow computer (MFC) 38 which regulates material flow, in particular a flow of the piece goods, through the system 10. The above-mentioned warehouse-managing software can include a storage-location managing module 40. The controlling device 30 and/or the DPS 32 can further include a navigation module 42, a traffic-regulating module 44, and/or a route-planning module 46, which are required for movements of the DTV 24 through the system 10. It is clear that the controlling device 30 and/or the DPS 32 can include further modules for ensuring the functionality of the system 10. In addition, it is clear that the navigation module 42, the traffic-regulating module 44, and the route-planning module 46 can also be part of the transport system 20. The modules 42-46 have been depicted only for facilitating an illustration in the area of the controlling device 30. This also applies for the other illustrated components of the controlling device 30, each of which can be implemented centrally, or in a de-centralized manner. The shown components of the controlling device 30 and/or the DPS 32 can communicate with each other, and with the other components of the system 10 shown, via communication channels 48, i.e. can exchange data indicated in FIG. 8 by means of double arrows 48. The communication channels 48 can be implemented wiredly and/or wirelessly.

One core element of the invention is to be seen in the order-picking machine 50 arranged in FIG. 1 exemplarily in the second picking area 16-2 dedicated to the articles of type B. It is clear that the order-picking machine 50 could also be arranged in each of the other picking areas 16. It is clear that the system 10 can also comprise more than one order-picking machine 50, which, in this case, could also be arranged in different picking areas 16-1 to 16-3. The order-picking machines 50 represent the fully automated machine mentioned above. The order-picking machine 50 preferably comprises at least one rack 52, as well as at least one storage and retrieval device 54 which can also be formed as a one-plane storage and retrieval device (shuttle). The order-picking machine 50 is configured to store piece goods without load carriers, as will be described in more detail below. The order-picking machine 50 is further configured to store the piece goods in an automated manner, to collect the piece goods in an automated manner in accordance with picking orders (in one stage or in two stages), and to deliver the piece goods to collecting devices 112, which are not illustrated here, as will be explained in more detail below. Thus, the order-picking machine 50 forms a system which is closed, is fed with the piece goods from the outside for the purpose of storing, and outputs to-be-picked piece goods independently.

In the following, material flow of piece goods through the system 10 will be described coarsely.

Goods-receipt piece goods (GR-PCG) 56 are delivered from the outside to the system 10 by one or more suppliers 58. The delivery may occur type-pure or mixed. This means that the piece goods do not need to be prepared by the suppliers 58 such that the piece goods need to be configured in advance in accordance with a demand (replenishment) of the order-picking machine 50. For example, goods-receipt piece goods 56 of one single article type can be delivered in a large number of pieces, for example, on a pallet (see "start"). Dependent on the type of the goods-receipt piece goods 56 being delivered, the goods-receipt piece goods 56 are either moved directly into a receiving station 60, or are buffered in a long-term warehouse 14, until there is a corresponding demand from the order-picking machine 50. Then, the goods-receipt piece goods 56 can be transported in a demand-orientated manner from the long-term warehouse 14 to the receiving station 60, and also back from there. The transport of the goods-receipt piece goods 56 can be conducted up to this time by conveying vehicles (e.g., forklifts, forklift trucks, conveying systems, or the like) which are not part of the transport system 20.

In the receiving station 60 the goods-receipt piece goods 56 are captured, preferably one single time, in particular for checking the correctness and completeness of the delivery of the supplier 56 (receiving inspection). For this purpose the receiving station 60 comprises a capturing device 62 (e.g., a scanner, camera, keyboard, or the like). After the goods-receipt piece goods 56 have been captured, i.e. in particular after an identification and registration in terms of data, the same are reloaded onto the transport carriers 28. Loaded transport carriers 28 are preferably transported by the DTV 24 from the receiving station 60 to the order-picking machine 50, and in particular by the DTS 22 only. It is clear that the loaded transport carriers 28 can also be transported by means of the DTV 24 to other picking areas 16, as indicated in FIG. 1 by dashed-line arrows. The loaded transport carriers 28 contain the goods-receipt piece goods 56, which have been captured (for one single time) and which are to be stored into the machine 50, in particular for ensuring an (initial or repeated) filling of the machine 50. Transport carriers 28 which have been emptied completely or partially at the order-picking machine 50 are transported back to the receiving station 60 by the DTV 24. Piece goods which have been picked by the order-picking machine 50, i.e. picked piece goods, can also be transported by the transport system 20 from the picking area 16 into the goods-issue area 18. Also, this transport preferably happens by the DTS 22 only. As soon as the picked piece goods are correspondingly completed for shipping, for example, by having been repacked into correspondingly addressed shipping containers 64, the piece goods leave the system 10 towards the customers 66, three of which are exemplarily depicted in FIG. 1. Then, the (material) flow of the piece goods through the system 10 ends.

Figure 2:
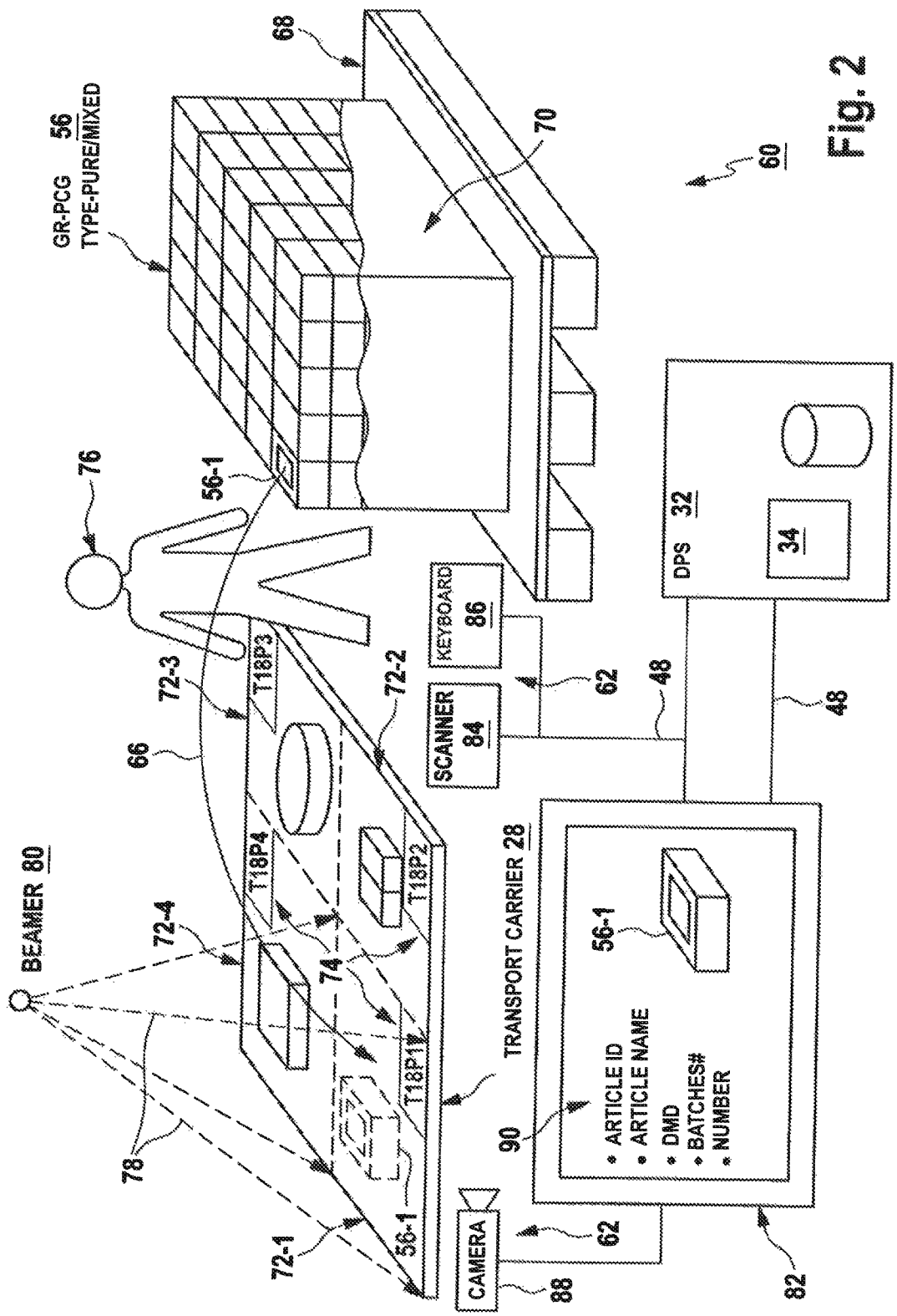
FIG. 2 shows a perspective view of an exemplary receiving station.

FIG. 2 shows a perspective view of an exemplary receiving station 60 usable in the system 10 of FIG. 1. FIG. 2 illustrates a manual loading process (cf. arrow 66) where a goods-receipt piece good 56 is reloaded from a (type-pure or mixedly loaded) goods-receipt pallet 68 carrying a stack 70 of goods-receipt piece goods onto one of the transport carriers 28 of the transport system 20 (cf. FIG. 1). It is clear that the transport carriers 28 can be loaded, additionally and alternatively, even in an automated manner. In the shown example the goods-receipt piece good 56-1 is to be placed from the stack 70 onto a free (i.e. unoccupied) deposition location 72-1 of the transport carrier 28, as indicated by dashed lines. In general, each of the transport carriers 28 of the system 10 comprises at least one, preferably several, unambiguously distinguishable and identifiable deposition locations 72. The transport carrier 28 shown in FIG. 2 comprises, for example, four deposition locations 72-1 to 72-4. The deposition locations 72 can be marked, for example, by printed lines in a visually distinguishable manner. The deposition locations 72 of the transport carrier 28 of FIG. 2 are marked by an individualizing deposition-location label 74. The transport carrier shown in FIG. 2 is, for example, a carrier (T) having the individualizing transport-carrier label "T18", so that the (deposition) locations, or places, (P) 72-1 to 72-4 having the deposition-location labels 74 "T18P1" to "T18P4" are marked. It is clear that the deposition-location label 74 only optionally needs to be illustrated visually so that an employee 76, who is supposed to transfer the goods-receipt piece goods 56 in accordance with the arrow 66, can find a preset delivery location 72 easier. A preset deposition location 72 can be determined in advance by the controlling device 30 (cf. FIG. 1), in order to achieve, for example, a machine-specific loading of the transport carrier 28. In this case the controlling device 30 or the DPS 32 selects a (free) deposition location 72 on one of the transport carriers 28, which is then transported to the machine 50 requiring the to-be-reloaded goods-receipt piece good 56-1. If the deposition locations 72 do not carry any visual deposition-location label 74 the desired deposition location 72 can be indicated to the employee 76, for example, by means of light beams 78, for example, of a beamer 80 (Put-to-Light). Further, it is possible to illustrate the to-be-loaded transport carrier 28 including the preset deposition location 72-1 graphically on a displaying device 82 such as a screen or monitor. Another possibility is to be seen in informing the employee 76 on the desired deposition location 72 by means of voice (Put-by-Voice). Other methods for guiding and directing the employee 76 are known to the person skilled in the art (e.g., Put-by-Vision).

In general, the goods-receipt piece goods 76 are captured (one single time) and identified before being reloaded onto the transport carriers 28. In the example of FIG. 2 three different capturing devices 62 (cf. FIG. 1) are shown exemplarily, which can be used alternatively or additionally, in order to capture the goods-receipt piece goods 56. In FIG. 2 a scanner 84, a keyboard 86, as well as a camera 88 are shown as exemplary capturing devices 62. The capturing device 62 captures at least one attribute 90 labels, or identifies the to-be-reloaded goods-receipt piece good 56. The labeling attribute 90 can comprise ore or more components. The attribute 90 can be represented by, for example, an article label (article ID), article name, date of minimum durability (DMD), and/or a batch number (batch #), as exemplarily shown graphically on the screen of FIG. 2. For example, the attribute 90 can be scanned, if present in terms of a barcode. An article number, or an article ID, can be input manually via the keyboard 86. The camera 88 can generate images of the to-be-reloaded goods-receipt piece good 56, which are used by image-recognition algorithms for identifying the to-be-reloaded goods-receipt piece good 56. The displaying device 82 displays the result of the capturing process in terms of the attributes 90 and, if necessary, in terms of a graphical image of the to-be-reloaded goods-receipt piece good 56-1. In this manner the employee 76 can verify that the capturing process and, if necessary, even the identification process have been successful.

In case of arbitrarily loading the transport carrier 28, the employee 76 can put the captured goods-receipt piece good 56-1 on an arbitrary free deposition location 72. In the example of FIG. 2 merely the first deposition location 72-1 is not occupied yet. Subsequently, the employee 76 communicates the deposition-location label 74 to the DPS 32, wherein the employee 76 inputs the label 74, for example, via the keyboard 86. Alternatively, the label 74 could also be communicated by means of voice or image recognition to the DPS 32 for updating the reference table 34 correspondingly. A further possibility of capturing a manually selected deposition location is represented by using radio technologies (RFID and/or NFC-transmitter/receiver at the deposition location 72, or on the hand, arm, or finger of the employee 76). Of course, the attribute 90 of the goods-receipt piece goods 56, which is just to be reloaded, is also communicated to the DPS 32. The updating of the reference table 34 will be described in more detail below.

With other words, this means that the free deposition locations 72 are either selected arbitrarily by the employee 76 and labels 76 thereof are subsequently communicated to the DPS 32, or the controlling device 30 or the DPS 32 selects (in advance), based on an order-picking-machine specific demand, transport carriers 28 which are assigned to the demanding order-picking machine 50 and which comprise the free deposition locations 72. Further, it is clear that, in general, several goods-receipt piece goods 56 (of the same type) can be put on the same deposition location 72, wherein in this case the information is tracked by the DPS 32. In particular, the loading of the same deposition location 72 for several times is a very good idea if the to-be-stored goods-receipt piece goods 76 are to be stored multiple-deep into the storage locations of the order-picking machine 50.

In general, the transport carriers 28 are formed such that relative movements of the piece goods are excluded during transport within the system 10. The transport carriers 28 can be provided, for example, by a skid-resistive layer (e.g., rubber or any other similar material). The deposition locations 72 can be shaped into a surface of the transport carriers 28, for example, in a slightly recessed manner. In general, it is true that the deposition locations 72 are separated from each other. The deposition locations 72 do not overlap. The deposition locations 72 are unambiguously distinguishable. However, the deposition locations 72 can be dimensioned differently. The deposition locations 72 can comprise a rim projecting from a surface of the transport carriers 28 for preventing the piece goods from moving into the area of an adjacent deposition location 72.

In general, it is further true that the transport carriers 28 are transported through the transport system 20 from the at least one receiving station 60 to the order-picking machine 50. For this purpose the transport system 20 can use, for example, steady conveyers (conventional conveying systems such as roller conveyers, belt conveyers, chain conveyers, over-head conveyers, and the like). However, usage of the autonomously moveable DTV 28 is preferred. The DTV 28 can cover arbitrary paths within the system 10. The DTV 28 can even be used for collecting and transporting piece goods which are to be picked, so that a uniform transport concept is achieved. If the DTV 28 transport to-be-picked piece goods, preferably this is not conducted by the transport carriers 28 but by the order containers or by the shipping containers 64 (cf. FIG. 1). In this case, the DTV 28 can collect the to-be-picked piece goods from each picking area 16 so that no additional consolidation step is required.

Figure 3:
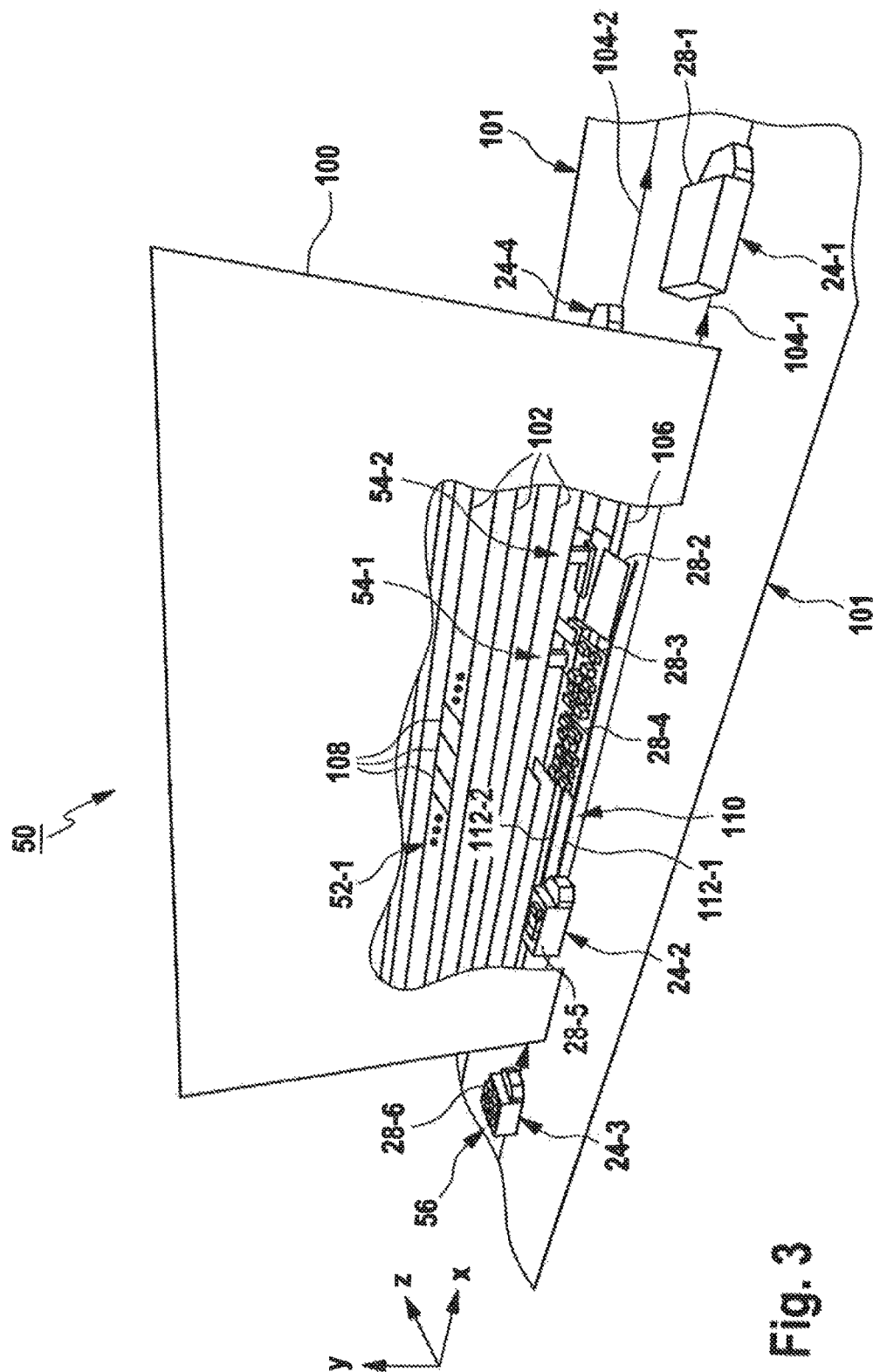
FIG. 3 shows a perspective view of an order-picking machine depicted in an isolated manner.

FIG. 3 shows a perspective view of the order-picking machine 50, which is depicted in an isolated manner and which can be used in the picking zones 16-1 to 16-3 of FIG. 1. The order-picking machine 50 (hereinafter also briefly called "machine 50") is of the same type as the fully-automated machine disclosed in WO 2015/039818 A1. However, the machine 50 of FIG. 3 distinguishes from the conventional fully-automated machines in that the transport system 20 (cf. FIG. 1), in particular in terms of the DTS 22 including its DTV 24, extends, at least for the purpose of storing the goods-receipt piece goods 56, through the machine 50 for bringing the transport carriers 28, which are loaded with the to-be-stored goods-receipt piece goods 56 (cf. transport-load carriers 28-3 to 28-6 in FIG. 3), into the machine 50. It is clear that the transport carriers 28 can also be transported into the machine 50 and from the machine 50 by means of different types of conveying systems (cf. conveying system 26 in FIG. 1). Preferably, however, the DTV 24 are used which move on the floor 101 along markers (not shown) described, for example, in the patent applications DE 10 2014 111 385 and DE 10 2014 111 394. The DTS 22, including the DTV 24 thereof, used here preferably is of the type described in these two patent applications.

The machine 50 of FIG. 3 is formed in terms of a closed system operated in a fully-automated manner. The machine 50 comprises an outer housing 100 for preventing the employee 76 from entering the machine 50 during an operation thereof. The machine 50 of FIG. 3 exemplarily comprises two racks 52 defining in the transversal direction Z a rack aisle (which is not shown and designated in more detail) therebetween where, for example, two storage and retrieval devices 54-1 and 54-2 can travel along travelling rails 106 in a longitudinal direction of the racks 52. In FIG. 3 merely the rack 52-1 of the two racks 52 is visible within the sectionally depicted area. The racks 52 comprise a plurality of rack shelves 102 being arranged on top of each other along the height direction Y. The rack shelves 102 can be divided in the longitudinal direction X, i.e. can be formed modularly (not depicted in FIG. 3). The rack shelves 102 represent a plurality of storage locations 108, wherein three storage locations 108 are shown exemplarily in FIG. 3, arranged next to each other in the longitudinal direction X. The storage locations 108 are formed for single-deep or multiple-deep storage of the goods-receipt piece goods 56. Each of the rack shelves 102, or each of storage locations 108, is unoccupied in FIG. 3. FIG. 3 shows a situation which occurs upon an initial filling of the machine 50.

In FIG. 3 three DTV 24-1 to 24-3 are shown which are used for storing. Further, another DTV 24-4 is shown which is used for storing, as will be explained with reference to FIG. 4 in more detail. The DTV 24-1 to 24-3 as well as the DTV 24-4 move along travelling paths 104-1 and 104-2. The travelling paths 104-1 and 104-2 extend through the machine 50. The travelling paths 104-1 and 104-2 extend, in the area depicted in FIG. 3, along the longitudinal direction X. The travelling paths 104 extend parallel to the travelling rails 106 of the storage and retrieval devices 54-1 and 54-2. The travelling rails 106 are arranged distanced relative to the travelling paths 104 in the transversal direction Z. The travelling rails 106 are arranged distanced to each other in the transversal direction Z.

The (storing) DTV 24-1 to 24-3 arrive in the machine 50 with loaded transport carriers 28 (cf. transport carriers 28-3 to 28-6 in FIG. 3). However, the DTV 24-1 to 24-3 are used for discharging empty, or partially emptied, transport carriers 28 (cf. transport carriers 28-1 and 28-2 in FIG. 3) from the machine 50. Partially emptied transport carriers 28 can be brought into different machines 50 (not illustrated in FIG. 3) for the purpose of storing the remaining goods-receipt piece goods 56. In general, the transport carriers 28 can carry goods-receipt piece goods 56 dedicated for different machines 50. Preferably, the transport carriers 28 are loaded, however, in a machine-specific manner, i.e. only for one single machine 50 with goods-receipt piece goods 56 in the receiving station 60. Empty transport carriers 28, which do not contain any piece goods, are transported back into the receiving station 60 for repeated loading with new goods-receipt piece goods 56. It is clear that the system 10 can also comprise a buffering warehouse (not shown in FIG. 1) for the transport carriers 28. In such a transport-carrier buffering warehouse the transport carriers 28 can be stored temporarily, in order to be delivered to the receiving station 60 and/or to the machines 50 later. The transport-carrier buffer is preferably used in case that the transport carriers 28 are loaded in a machine-specific manner, in particular with a plurality of different goods-receipt piece goods 56 respectively in accordance with a pre-planned loading scheme. An exemplary transport-carrier buffer will be described in more detail with reference to FIG. 5.

In order to avoid that the DTV 24 need to stay within the machine 50 until each of the to-be-stored goods-receipt piece goods 56, which are provided by the transport carrier(s) 28 on the respective DTV 24, has been retrieved, one or more transport-carrier buffering stations 110 can be provided within the machine 50. In FIG. 3, for example, one transport-carrier buffering station 110 is shown.

In general, it is true that the buffering station 110 is configured to receive and deliver the transport carriers 28 in an isolated manner, i.e. separately from the DTS 22 or the conveying system 26. For this purpose each of the buffering stations 110 can comprise one or more conveyers. The buffering station 110 of FIG. 3 comprises two strap, or chain, conveyers 112-1 and 112-2 extending substantially in the longitudinal direction X and being arranged distanced to each other in the transversal direction Z. The conveyers 112-1 and 112-2 are arranged in a height such that the DTV 24 can pass beneath the buffering station 110. In an in-feeding section, which is not designation in more detail, and in an out-feeding section the conveyers 112 are inclined relative to a horizontal line such that the conveyers 112 engage a load-handling device of the DTV 24, which is not shown and designated in more detail, for lifting and delivering the transport carriers 28. The buffering station 110 comprises a length, preferably in the longitudinal direction X, allowing buffering of several loaded transport carriers 28 one behind the other (cf. 28-3 and 28-4 in FIG. 3).

In FIG. 3 the buffering station 110 is arranged beneath the rack shelves 102 of the rack 52-1. Some of the rack shelves 102 which are located in the immediate vicinity in the vertical direction Y relative to the buffering station 110 are interrupted for providing sufficient space for the storage and retrieval devices 54, in order to transfer the to-be-stored goods-receipt piece goods 56 from the loaded transport carriers 28 into empty storage locations 108. The buffering station 110 is further arranged such that the storage and retrieval devices 54 can access the to-be-stored goods-receipt piece goods 56 on the transport carriers 28. For this purpose the load-handling device 118 of the storage and retrieval devices 54 can be formed correspondingly (e.g., can be moved sufficiently in the transversal direction Z).

Figure 4:
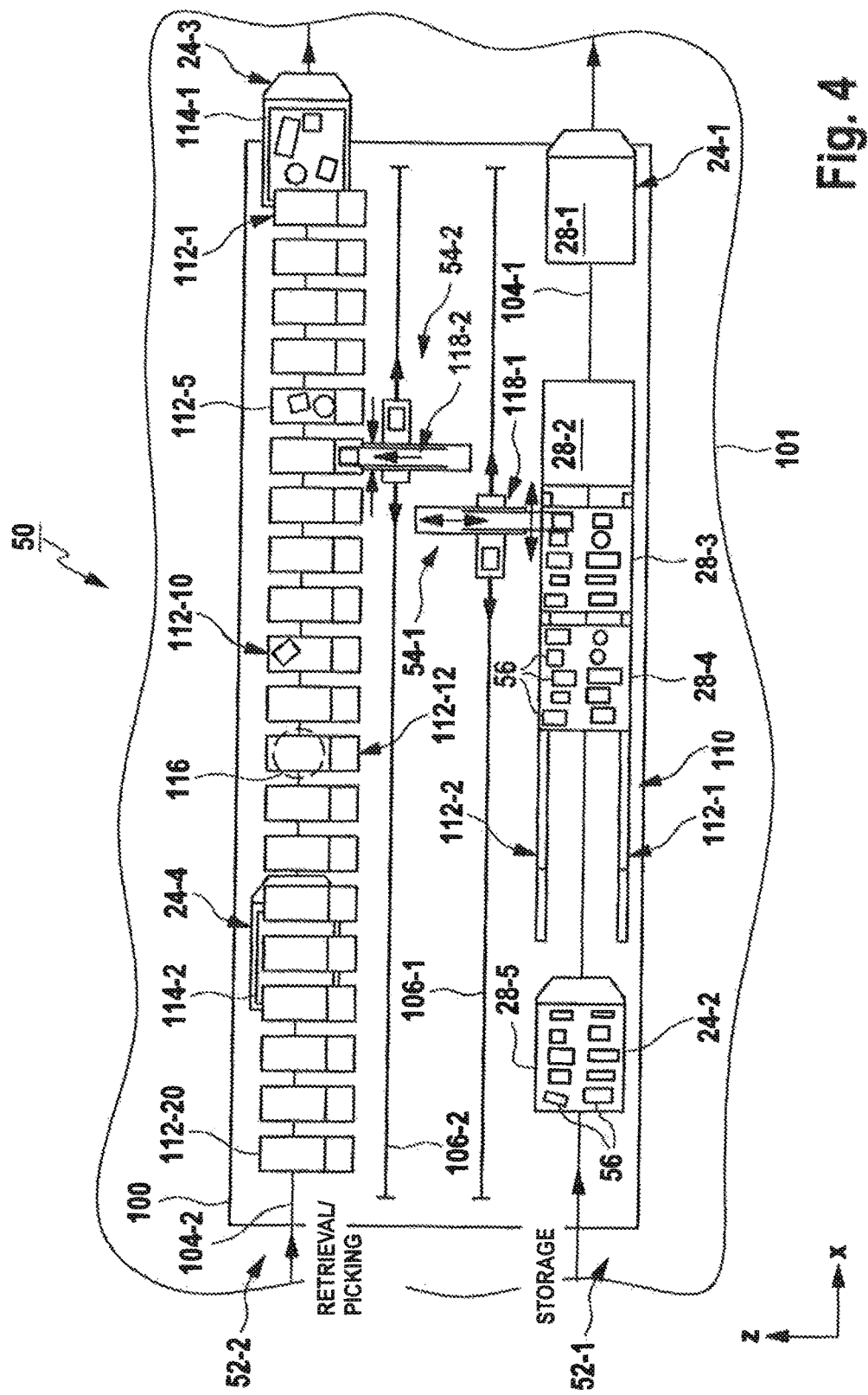
FIG. 4 shows a broken top view of the order-picking machine of FIG. 3.

FIG. 4 shows the machine 50 of FIG. 3 in a broken top view, wherein in particular the lowermost region of the machine 50 is shown.

Storage of the goods-receipt piece goods 56 occurs in the region of the first rack 52-1. Retrieval, or picking, of the piece goods occurs beneath the second rack 52-2, where a plurality of collecting devices 112 is provided. The machine 50 comprises, for example, twenty collecting devices 112-1 to 112-20, each of which is preferably formed identically. The collecting devices 112 are aligned along the travelling path 104-2 and substantially extend in the longitudinal direction X. The DTV 24-3 and 24-4 move from the left to the right along the travelling path 104-2 in FIG. 4 and, in this case, travel beneath the collecting devices 112 in the height direction Y. The DTV 24-3 and 24-4 respectively carry one order container 114 for collecting piece goods in an order-orientated manner. Here, a large strength of the system 10 is expressed because the DTV 24 can be used for both storing and retrieving, or picking, and thus allow realization of a uniform transport concept. Of course, also the conveying system 26 could be used additionally, for example, for the retrieval instead of the DTV 24, so that a hybrid transport system 20 would be present.

The collecting devices 112 are arranged in the height direction Y such that the DTV 24, including the order containers 114, can travel beneath the collecting devices 112. The collecting devices 112 are respectively provided with a dispensing device (e.g., automated flaps or pushers in the lower bottom region) which are not shown and designated in more detail, in order to deliver collected piece goods in an automated manner, preferably by means of gravity, to the corresponding order containers 114. The DTV 24 can travel continuously beneath the collecting devices 112 during transfer. However, the DTV 24 can also stop for a short time beneath the respective collecting device 112. The DTV 24-3 carries the order container 114-1, which is filled with piece goods which have been buffered before in one or more of the collecting devices 112. The collecting devices 112-5 and 112-10 currently buffer piece goods, which have been retrieved by the storage and retrieval devices 54 from storage locations 108 (cf. FIG. 3) and moved via receiving openings 116 (cf. collecting device 112-12) for being delivered into the corresponding collecting device 112 subsequently. The load-handling devices 118-1 and 118-2 of the storage and retrieval devices 54-1 and 54-2 are formed correspondingly. The load-handling devices 118 are exemplarily formed in FIG. 4 in terms of prong-shaped grippers, which are not designated in more detail and which can be retracted and extended into the storage locations 108 in the transversal direction Z and which are moveable to each other and away from each other in the longitudinal direction X, in order to remove the piece goods from the transport carriers 28, in order to store the same into the storage locations 108, and in order to retrieve the same from the storage locations 108. The load-handling device 118-1 grabs one to-be-stored goods-receipt piece good 56 from the transport carrier 28-3. The load-handling device 118-2 of the second storage and retrieval device 54-2 has retrieved one piece good from one of the storage locations 108 for delivering this piece good to one of the collecting devices 112. It is clear that the load-handling devices 118 are formed such that they can interact with both racks 52-1 and 52-2.

Further, it is clear that the storage and retrieval devices 54 can also pick goods-receipt piece goods 56 directly from the transport carriers 28 (cf. 28-3 and 28-4 in FIG. 4) (cross docketing) without the need that the corresponding goods-receipt piece goods 56 have been stored. Here another particular strength of the system 10 expresses because a lot of goods-receipt piece goods 56 can be provided simultaneously without the need to store the same into the storage locations 108 in advance. This procedure can be very helpful for absorbing peak loads.

Further, it is clear that the collecting devices 112 can also extend to the outside so that the retrieval DTV 24 (compare 24-3 and 24-4 in FIG. 4) cannot travel through the machine 50 but pass the machine 50 externally for receiving the collected piece goods. However, an integration of both the storage DTV 24 and retrieval DTV 24 into the machine 50 is preferred because the storage density can be increased thereby. A number of machines 50 can be positioned one behind the other and/or next to each other, preferably in high density. External regions of the machines 50 can be used exclusively for the material flow within the system 10. Regions adjacent to the machines 50 are no longer required for conducting storage. Outside of the machines 50 the traffic of the DTV 24 flows because the DTV 24 are stopped only, if at all, within the machines 50 for transferring piece goods or transport carriers 28.

Figure 5:
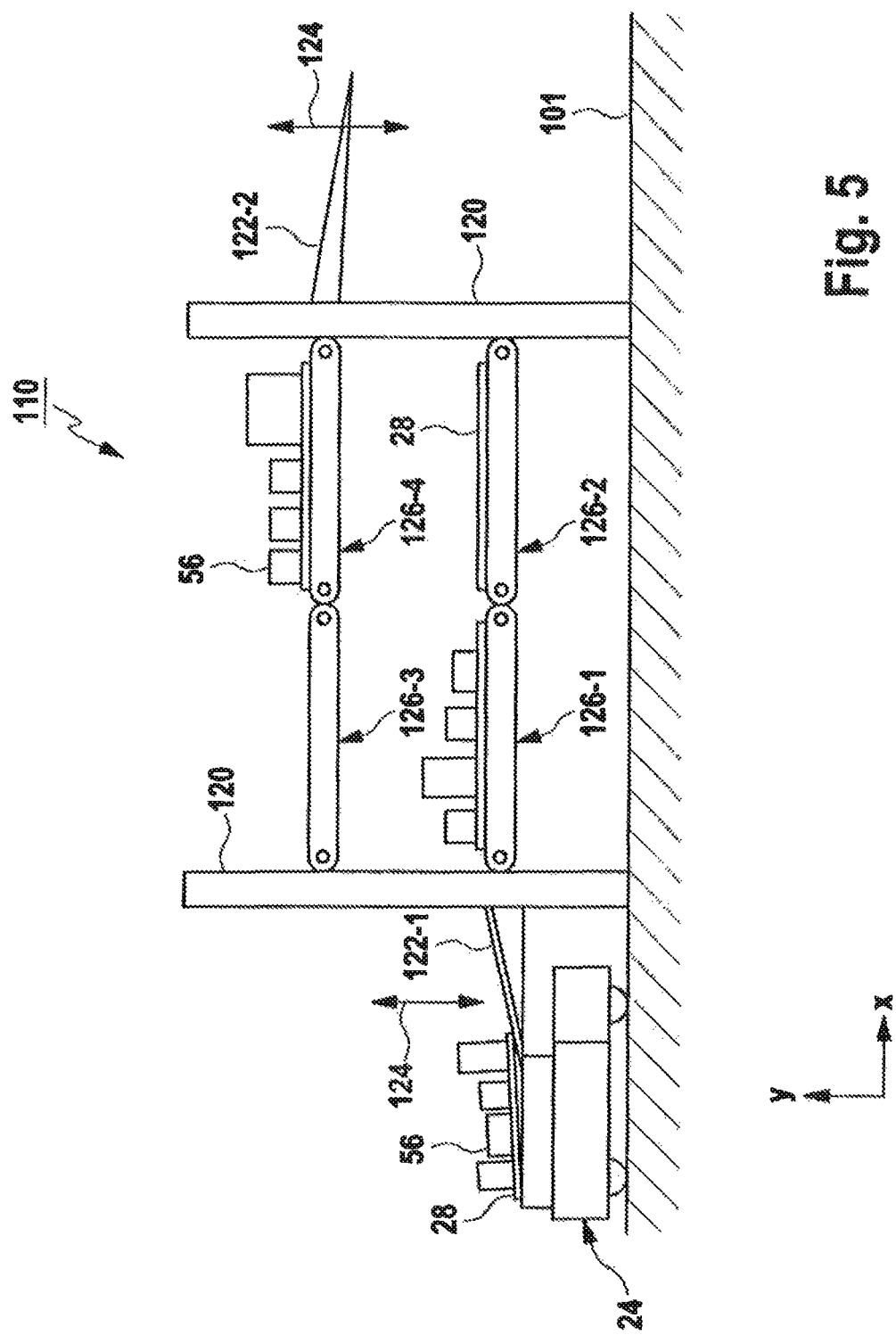
FIG. 5 shows a side view of an isolatedly depicted transport-carrier buffering station.

FIG. 5 shows a side view of an isolatedly depicted transport-carrier buffering station 110 representing a modification of the buffering station 110 of FIG. 4.

The buffering station 110 of FIG. 5 is structured like a rack. The buffering station 110 comprises poles 120 extending in the height direction Y and serving as base frame of the buffering station 110. Conveying elements 122 formed like ramps are supported along the poles 120 in vertically moveable manner (cf. arrows 124). The conveying elements 122 are moveable in the vertical direction Y within a range where the DTV 24 can receive or deliver the transport carriers 28 in a meshing manner as explained, for example, in the patent application DE 10 2014 111 396.

The poles 120 are arranged distanced to each other in the longitudinal direction X. In the longitudinal direction X linear conveyers 126 are arranged between the opposing poles 120. In FIG. 5 four linear conveyers 126-1 to 126-4 are shown. It is clear that more or less linear conveyers 126 can be used. The linear conveyers 126 of FIG. 5 are arranged exemplarily in two planes in the height direction Y. Both of the linear conveyers 126-1 and 126-2 are located in a lower plane. The linear conveyers 126-3 and 126-4 are located in an upper plane. Respectively two of the linear conveyers 126 are arranged behind each other in the longitudinal direction X, in order to provide two buffer locations. The buffering station 110 of FIG. 5 provides four buffer locations in total, three buffer locations of which are already occupied by transport carriers 28. The transport carrier 28, which is just delivered by the DTV 24 to the conveying element 22-1, can be parked on the linear conveyer 126-3 (buffer location) by lifting the conveying element 122 vertically to the second plane and by actively driving the conveying element 122 as well as the linear conveyer 126-3 for transferring the transport carrier 28. The transport carriers 28 exit the buffer locations analogously by driving the conveying element 122-2 vertically to the correct plane and actively driving the involved conveyers subsequently. The transport carriers 28 can be transferred between buffer locations on the same plane (in both directions) by driving the corresponding linear conveyers 126, preferably in a synchronized manner. Arbitrarily many planes and buffer locations can be provided.

Further, it is clear that the storage and retrieval directions (transport directions) can be defined, in general, also inversely and/or oppositely, even for the DTV 24.

In addition, it is clear that the buffering station 110 can be arranged additionally, independent from its configuration, even in the region of the receiving station 60 for loading a plurality of the transport carriers 28 in a machine-specific manner. Typically, the goods-receipt piece goods 56 are delivered in a type-pure manner at the receiving station 60 so that several receiving cycles (delivery of goods-receipt piece goods, capturing and identifying the goods-receipt piece goods including, if necessary, checking and transferring the goods-receipt piece goods) need to be performed, for the purpose of mixing the piece goods, until each of the machine-specific transport carriers 28 comprises its desired load of to-be-stored-receipt piece goods 56.

Figure 6:
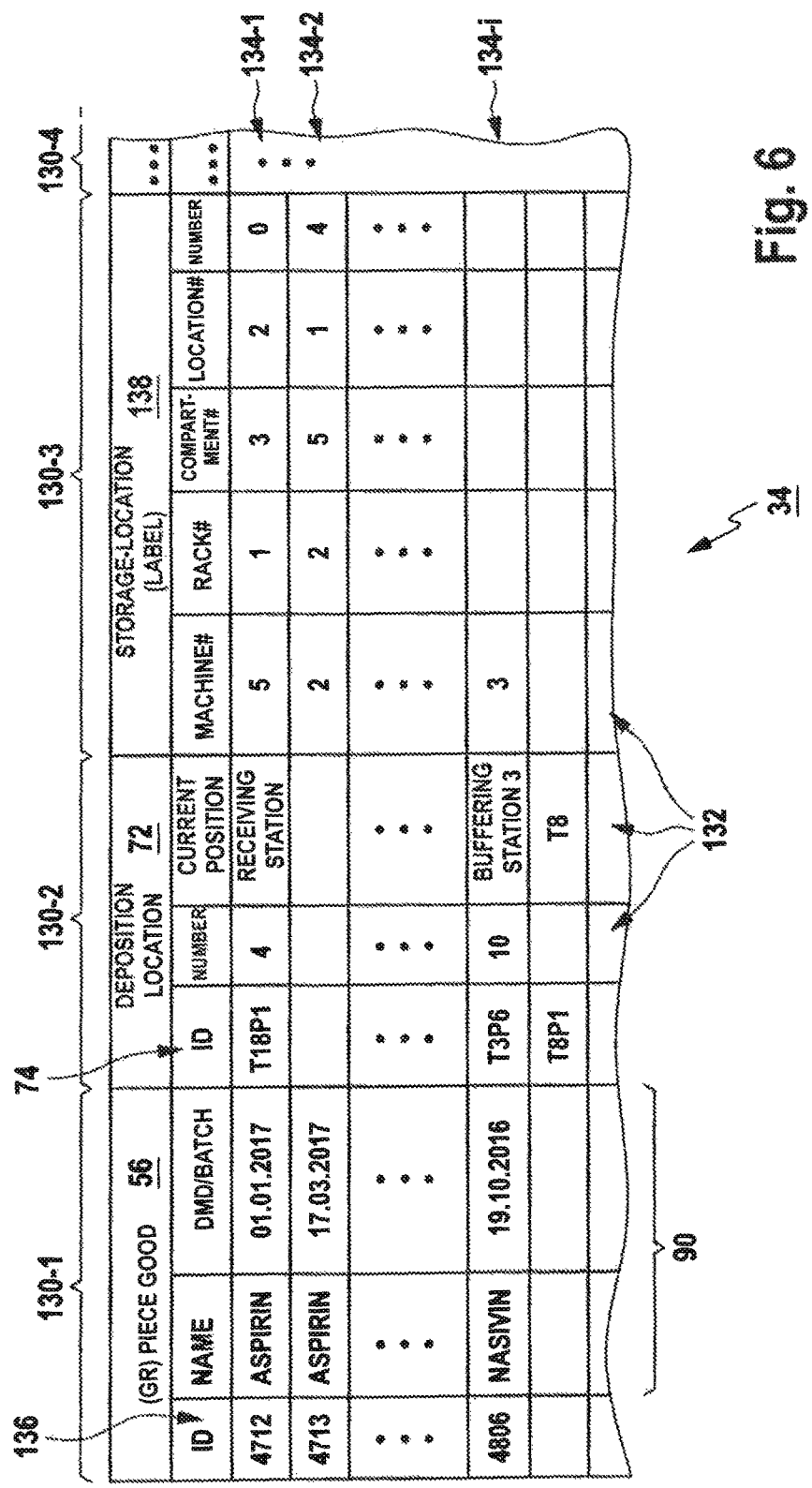
FIG. 6 shows a reference table.

FIG. 6 shows an exemplary embodiment of the reference table 34. The reference table 34 is processed by the DPS 32 for assigning one of the storage locations 108 to the goods-receipt piece goods 56, wherein the to-be-stored goods-receipt piece goods 56 are preferably captured in terms of data, preferably one single time only, in particular in the receiving station 60 within the goods-receipt area 12 (cf. FIG. 1).

The table 34 comprises several sections 130 which are associated logically. In the first section 130-1 information in terms of data fields 132 are stored identifying the to-be-stored goods-receipt piece goods 56 unambiguously. In the section 130-2 information on the deposition locations 72 on the transport carriers 28 are stored. In the section 130-3 information on the associated storage location 108 in the machine 50 is stored. Further information can be stored in one or more additional sections 130-4. Data fields 132 being arranged in one line 134 of the table 34 belong to each other and form an associated data set.

The first line 134-1 of the table 34 of FIG. 6 represents, for example, the pharmaceutical article "Aspirin" having a date of minimum durability (DMD) of Jan. 1, 2017. A system-internal piece-good label (ID) 136 having the designation "4712" has been assigned to this article. In the receiving station 60 already four of these Aspirin articles have been placed onto the deposition location 72 having the deposition-location label 74 being designated by "T18P1". At present, the corresponding transport carrier 28 (having the transport-carrier label "T18") is still located in the receiving station 60. These four Aspirin articles, however, have already been assigned, by the DPS 32 (e.g., by means of a warehouse-management software), to a storage location 108 having the unambiguous, or unique, storage-location label 138. Both the deposition-location label 74 and the storage-location label 138 represent unambiguous addresses, or locations, within the system 10. The Aspirin article of the first line 134-1 is to be stored, for example, at the storage location 108 having the (exemplary) storage-location label "5-12-3-2" where zero articles are stored at present. The designation "5-12-3-2" represents a machine number, a rack number, a rack-compartment number or rack-shelf number, as well as a rack-location number, or storage-location number, in the machine "5" in the rack "12" in the rack compartment "3". The first line 134-1 represents a state in which the article having the piece-good label "4712" has already been captured and identified as well as reloaded onto the transport carrier 28 in the receiving station 60, wherein a destination location thereof within the system 10, or one of the machines 50, is also already determined by the DPS 32, in order to satisfy, for example, the replenishment demand of this machine 50.

The second line 134-2 serves for illustrating a situation in which the corresponding goods-receipt piece good 56 has already been captured and identified in the receiving station 60, but has not yet been reloaded onto one of the transport carriers 28. Also, the destination location of this article is set already. In this example the employee 76 arbitrarily selects, for example, a free deposition location 72 (cf., for example, 72-1 in FIG. 1) for loading the goods-receipt piece good 56 onto the transport carrier 28. This is tracked and updated in the table 34 by communicating the corresponding deposition-location label 76.

The further line 134-i serves for exemplarily illustrating a situation in which the employee 76 has already reloaded the goods-receipt piece good 56 on one of the transport carriers 28. This transport carrier 28 is currently still located in the region of the third buffering station. A destination location thereof is only set in terms of the third machine 50. It has not yet been set into which storage location 108 the corresponding article will be stored actually. This decision can be taken at short notice, for example, dependent on which of the storage locations 108 of the third machine 50 is actually free at the time of the delivery of the corresponding transport carrier 28 to the third machine 50 (chaotic storage). Thus, compared to a zip-code system, only the routing digit is known for the time being which, however, is sufficient for sending the piece good to the right machine 50.

Thus, the table 34 expresses that due to one single capturing of the goods-receipt piece good 56 a whereabouts as well as a destination location of this piece good can be described and set unambiguously, wherein a sufficient degree of dynamics is nevertheless provided for allowing reaction to external circumstances (e.g., priority orders, or the like), for example at short notice.

It is clear that the table 34 actually does not need to be provided in this configuration. The table 34 can also be realized in the configuration of a rational database. The table 34 can be formed of data fields and/or data sets being part of different controlling and managing modules (e.g., inventory data bases, storage-location data base, picking-order processing data base, or the like). Further, it is clear that each relevant information, or data field, is exchanged between the table/DPS and the involved components of the system 10.

Further, it is generally possible to transfer the transport carriers 28 directly into the racks 52 if the rack shelves 102 and the transport carriers 28 are configured correspondingly. In this case, the rack shelves 106 and the transport carriers 28 can comprise, for example, almost identical dimensions. The rack shelves 106 and the transport carriers 28 can further comprise identical suspensions for being supported within the racks 52. It is clear that the load-handling devices 118 of the storage and retrieval devices 54 are correspondingly configured in this case for storing the rack shelves 106 or the transport carriers 28 into the racks 52, for retrieving the same from the racks 52, for lifting the same from the DTV 28, and for depositing the same onto the DTV 28.

Further, it is clear that the goods-receipt piece goods 56 do not need to be placed necessarily on a free deposition location 72 on one of the transport carriers 28. If it is determined, after the capturing of the corresponding goods-receipt piece goods 56, by the DPS 32 that this specific article type including each of its attributes and features is already present on one of the transport carriers 28, then this goods-receipt piece good 56 can be placed additionally onto the corresponding deposition location 72 so that the number of this specific article type on this deposition location 72 is correspondingly increased.

FIG. 6 shows a flow chart of a method 150 for operating a storage and order-picking system 10 in accordance with the invention, in particular a method for filling an order-picking machine 50 of the above-mentioned type.

The method 150 starts in step S10 with the delivery of the goods-receipt piece goods 56 by the suppliers 58. In a further step S12 the delivered goods-receipt piece goods 56 are captured, preferably only once. This capturing occurs in the receiving station 60 and substantially serves for identifying the goods-receipt piece goods 56. The capturing can be further used for checking the completeness and correctness of the delivery. In step S12 it can be inquired whether the just captured (and identified) goods-receipt piece good 56 is immediately required for the (initial or repeated) filling of the machine 50.

In step S16 it is inquired which entity (employee or DPS) determines the (free) deposition location 72 on one of the transport carriers 28. In the step S18 the employee 76 selects the free deposition location 72-1. In step S20 the DPS 32 selects the free deposition location 72-1. It is clear that the inquiry of the step S16 can also occur at a different time. This depends, for example, on whether the initial, or repeated, filling of the machine 50 is triggered by demand or triggered by the delivery of the goods-receipt piece goods 56. In the demand-dependent case the DPS 32 selects the deposition locations 72. In case of a delivery the employee 76 selects the free deposition locations 72. If the employee 76 selects the free deposition locations 72, this typically happens directly after the capturing in step S12. If the DPS 32 selects the free deposition location 72 in step S20 this selection can occur temporally decoupled from the capturing of step S12 and temporally decoupled from the delivery of step S10. In this case it is possible that, for example, the delivered piece goods are first moved into the long-term warehouse 14, after the capturing thereof, for being loaded later, in particular without further capturing, onto the transport carriers 28 (cf. step S22). In step S24 the transport carriers 28 as well as the goods-receipt piece goods 56 are provided in the receiving station 60. Then, in step S26 the provided transport carriers 28 are loaded with the (already captured) goods-receipt piece goods 56. In step S28 the completely loaded transport carriers 28 are moved to, or into, the machine 50. The corresponding labels are communicated to the DPS 32 for updating the table 34.

In step S30 it is inquired (in the table 34) whether a storage location 108 has already been selected for the to-be-stored goods-receipt piece good 56 which is located on the transport carrier 28. If a storage location 108 has not yet been selected, free storage location is selected in step S32. The storage and retrieval device 54 then grabs the corresponding goods-receipt piece good 56 from the transport carrier 28 and transfers the same into the selected storage location 108 for the purpose of storage (cf. step S32). If the selection of the storage location 108 has already been made, for example, by a corresponding demand notification of the machine 50, the storing step S34 occurs immediately.

In step S36 it can be inquired (optionally) whether the machine 50 requires additional piece goods. This means that the demand of the machine 50, which can also be tracked in the table 34, is determined. If the machine 50 does not need further piece goods in terms of replenishment, the method ends. However, if the machine 50 requires additional piece goods, it is inquired in step S38 whether the required piece goods are already in the system 10. If the piece goods are already in the system 10, in particular in the long-term warehouse 14, the corresponding goods-receipt piece goods 56 are provided at the receiving station and are reloaded onto corresponding transport carriers 28, in particular without being captured once again (cf. step S24). If the required piece goods are not present, these are ordered in step S40 which subsequently results in a delivery in accordance with the step S10.

If vertical and horizontal orientations have been mentioned above, it is clear that these orientations can be exchanged against each other at any time by rotation, and therefore are not to be interpreted in a limiting manner. In the description of the figures the selection of the orientation of the coordinate system is generally in line with the designations typically used in the field of intralogistics so that the longitudinal direction is designated by X, the depth (or the transversal direction) is designated by Z, and the (vertical) height direction is designated by Y. Further, identical parts and features are provided with the identical reference signs. The disclosures contained in the description can be transferred roughly to similar parts and features having similar reference signs. Position and orientation indications (such as "above", "below", "lateral", "longitudinal", "transversal", "horizontal", "vertical", and the like) refer to the immediately described figure. If the position or orientation is changed these indications are to be transferred roughly to the new position or orientation.

An "article" is a (smallest) unit of an article assortment distinguishable by an article type. The articles are represented by the piece goods. The piece goods are individualized distinguishable goods which can be handled individually and stock of which is tracked by pieces or cases. The terms "articles" and "piece goods" have been used equivalently here.

Coordinating a processing of picking orders is handled by an order processing being integrated into the controlling device 30. The controlling device 30 can further comprise an enterprise-resource planning system.

In general, the design of the disclosed racks, in particular an orientation of the rack compartments or rack locations, can deviate from the rigid horizontal orientation. The rack compartments can be formed such that they comprise, for example, a V-shaped base so that, in particular round or cylindrical, piece goods can always be arranged (by means of gravity) in a predetermined region of the rack compartments thereby facilitating storage and retrieval by machines significantly, because the position of the stored piece good within the rack compartment does not need to be detected. In this case the rack compartments are orientated diagonally. Further, racks can be used which have, for example, honeycomb-like rack compartments or rack locations. Such racks are formed one behind the other in the transversal direction Z, preferably in several stages, and are displaceable in the longitudinal direction X for allowing access to a rear rack row.

LIST OF REFERENCE SIGNS

10 Storage and order-picking system
12 GR area
14 Long-term warehouse (optionally)
HBW High-bay warehouse
16 Picking area
18 GI area/shipping
20 Transport system
22 Driverless transport system (DTS)
24 Driverless transport vehicle (DTV)
26 (Stationary) conveying system (optionally)
28 Transport carrier
30 Controlling device
32 Data-processing system (DPS)
34 Reference table
36 Warehouse-management computer (WMC)
38 Material-flow computer (MFC)
40 Storage-location managing module
42 Navigation module
44 Traffic-regulating module
46 Route-planning module
48 Communication
50 Order-picking machine
52 Rack
54 Storage and retrieval device/shuttle
56 GR-PCG
58 Supplier
60 Receiving station
62 Capturing device
64 Shipping container
66 Loading process
68 GR pallet
70 Stack of GR-PCG
72 Deposition location 74 Deposition-location label
76 Employee
78 Light beams
80 Beamer
82 Displaying device
84 Scanner
86 Keyboard
88 Camera
90 Attribute of 56
100 Casing of 50
101 Floor
102 Rack shelf of 52
104 Travelling path
106 Travelling rail of 54
108 Storage location
110 Transport-carrier buffering station
112 Strap/chain conveyer
114 Order containers
116 Receiving opening of 112
118 Load-handling device of 54
120 Pole
122 Ramp-shaped conveying elements
124 Vertical movement of 122
126 Linear conveyer
130 Section/region of 34
132 Data field
134 Line of 34
136 Piece-good label
138 Storage-location label
150 Method Therefore what we claim is:

1. A storage and order-picking system for picking piece goods in accordance with picking orders, wherein the piece goods belong to different access-frequency categories, comprising:
   at least one order-picking machine dedicated to piece goods substantially belonging to one of the access-frequency categories, wherein each of the order-picking machines is configured to store, collect, buffer, and deliver the piece goods in a fully-automated manner, wherein each of the order-picking machines comprises a plurality of storage locations, wherein each of the storage locations comprises an individualizing storage-location label;
   a receiving station being configured to capture a labeling attribute of a goods-receipt piece good;
   a transport system comprising a plurality of transport carriers, wherein each of the transport carriers comprises a plurality of deposition locations where the goods-receipt piece good is placeable for the purpose of loading the transport carrier, and wherein an individualizing deposition-location label is assigned to each of the deposition locations; and
   a data-processing system (DPS) being configured to manage and update a reference table, wherein the reference table is configured to assign the labeling attribute, one of the deposition locations, and one of the storage locations to the goods-receipt piece good;
   wherein the transport system connects, in terms of material flow, the receiving station and the at least one order-picking machine for transporting one of the transport carriers, which is loaded in the receiving station with the goods-receipt piece good by placing the goods-receipt piece good onto a selected one of the deposition locations, from the receiving station to the at least one order-picking machine, and for transporting emptied ones of the transport carriers back to the receiving station for the purpose of loading; and
   wherein the DPS is further configured to update the reference table for the goods-receipt piece good by assignment based on the captured labeling attribute, based on a deposition-location label of a selected one of the deposition location, and based on a storage-location label of a selected one of the storage locations.

2. The system of claim 1, wherein the receiving station is further configured to capture the deposition-location label of the selected one of the deposition locations.

3. The system of claim 1, wherein the at least one order-picking machine comprises:
   a rack comprising a plurality of rack shelves being arranged at least one of on top of each other and next to each other, and into which the piece goods can be stored single-deep or multiple-deep;
   at least one collecting device being configured for temporarily collecting several ones of the piece goods, and comprising a receiving opening and a delivering device; and
   a storage and retrieval device moveable along the rack in a longitudinal direction, and configured to store and retrieve the piece goods along a transversal direction in and from each of the storage locations, and to deliver the same to the receiving openings of the collecting devices.

4. The system of claim 1, wherein the transport system comprises a plurality of driverless transport vehicles (DTV), wherein each of the DTV is configured to transport the transport carriers through the system.

5. The system of claim 4, wherein the at least one order-picking machine is configured such that the DTV are allowed to travel through the at least one order-picking machine for unloading the transport carriers within the at least one order-picking machine.

6. The system of claim 5, wherein the at least one order-picking machine is configured such that the DTV are allowed to travel through the at least one order-picking machine for delivering and receiving the transport carriers to and from the at least one order-picking machine, respectively.

7. The system of claim 4, wherein the DTV are guided at least one of past and through the at least one order-picking machine such that collected piece goods are deliverable to the DTV in an automated manner.

8. The system of claim 1, wherein each of the order-picking machines is arranged in a picking area of the system, wherein the receiving station is arranged in a goods-receipt area of the system, and wherein the picking area and the goods-receipt area are arranged remote to each other.

9. The system of claim 1, wherein of the goods-receipt piece good is storable into the at least one order-picking machine only via the transport carriers.

10. The system of claim 1, further comprising at least one transport-carrier buffering station being arranged within the at least one order-picking machine, wherein a storage and retrieval device of the at least one order-picking machine is moveable along the buffering station for grabbing to-be-stored goods-receipt piece goods from the transport carriers and for delivering the grabbed goods-receipt piece goods to free storage locations, wherein the storage locations into which to-be-stored goods-receipt piece goods have already been delivered, are identified as occupied storage locations and are communicated to the reference table for a corresponding update.

11. The system of claim 10, wherein the receiving station comprises a further transport-carrier buffering station.

12. The system of claim 10, wherein the transport-carrier buffering station is configured to receive, buffer, and deliver back to the transport system at a later time the transport carriers separately from the transport system.

13. The system of claim 1, wherein the DPS is further configured to assign free deposition locations, based on piece-good demand notifications generated by a warehouse-management computer for filling the at least one order-picking machine at least one of initially and repeatedly with the piece goods, and to display the free deposition locations in the receiving station as soon as the corresponding goods-receipt piece good and the corresponding transport carrier are available at the receiving station for loading.

14. The system of any claim 1, wherein the at least one order-picking machine comprises exchangeable rack shelves, and wherein the transport carriers are formed such that the transport carriers are exchangeable against the rack shelves.

15. A method for filling an order-picking machine with piece goods in a storage and order-picking system, which system comprises: at least one order-picking machine dedicated to piece goods substantially belonging to one access-frequency category, wherein each of the order-picking machines is configured to store, collect, buffer, and deliver the piece goods in a fully-automated manner, wherein each of the order-picking machines comprises a plurality of storage locations, wherein each of the storage locations comprises an individualizing storage-location label; a receiving station being configured to capture a labeling attribute of a goods-receipt piece good; a transport system comprising a plurality of transport carriers, wherein each of the transport carriers comprises a plurality of deposition locations where the goods-receipt piece good is placeable for the purpose of loading the transport carrier, and wherein an individualizing deposition-location label is assigned to each of the deposition locations; and a data-processing system (DPS) being configured to manage and update a reference table, wherein the reference table is configured to assign the labeling attribute, one of the deposition locations, and one of the storage locations to the goods-receipt piece good; wherein the transport system connects, in terms of material flow, the receiving station and the at least one order-picking machine for transporting one of the transport carriers, which is loaded in the receiving station with the goods-receipt piece good by placing the goods-receipt piece good onto a selected one of the deposition locations, from the receiving station to the at least one order-picking machine, and for transporting emptied ones of the transport carriers back to the receiving station for the purpose of loading; and wherein the DPS is further configured to update the reference table for the goods-receipt piece good by assignment based on the captured labeling attribute, based on a deposition-location label of a selected one of the deposition location, and based on a storage-location label of a selected one of the storage locations; and wherein the method comprises the steps of:

providing the goods-receipt piece good and one of the transport carriers in the receiving station;

capturing the labeling attribute of the goods-receipt piece good;

selecting one of the deposition locations on the one of the transport carriers, which is free, for the goods-receipt piece good;

placing the goods-receipt piece good on the selected deposition location of the provided transport carrier;

selecting a free one of the storage locations for the goods-receipt piece good;

updating the reference table for the goods-receipt piece good by assignment based on the captured labeling attribute of the goods-receipt piece good, based on the deposition-location label of the selected deposition location, and based on the storage-location label of the selected storage location; and transporting the one of the transport carriers, on which the goods-receipt piece good is placed, from the receiving station to the at least one order-picking machine based on the storage-location label of the goods-receipt piece good.

16. The method of claim 15, further comprising: transferring the goods receipt-piece good from the one of the transport carriers arrived in the at least one order-picking machine onto the selected storage location based on the corresponding storage-location label by a storage and retrieval device.

* * * * *